United States Patent [19]

Lee

[11] Patent Number: 4,628,496
[45] Date of Patent: Dec. 9, 1986

[54] ULTRASONIC SENSING AND MONITORING SYSTEMS

[75] Inventor: Charles E. Lee, Miller Place, N.Y.

[73] Assignee: Von Duprin, Inc., Indianapolis, Ind.

[21] Appl. No.: 635,300

[22] Filed: Jul. 27, 1984

[51] Int. Cl.$^4$ ............................................. G08B 21/00
[52] U.S. Cl. ..................................... 367/93; 307/117; 340/540
[58] Field of Search .................. 367/93; 340/573, 552, 340/540; 307/117; 49/26, 31

[56] References Cited

U.S. PATENT DOCUMENTS

| | | | |
|---|---|---|---|
| 3,233,084 | 2/1966 | Kendall et al. | 367/93 |
| 3,367,450 | 2/1968 | Lester et al. | 367/93 |
| 3,622,957 | 11/1971 | Libengood et al. | 367/93 |
| 4,459,689 | 7/1984 | Biber | 367/93 |

OTHER PUBLICATIONS

Polaroid, "Ultrasonic Ranging System" brochure.
Polaroid, "Tech. Specifications for Polaroid Electrostatic Transducer".
Texas Instruments, Specifications for SN28827 Ranging Module, SN28826 Soner Ranging Control IC, SN 28825 Sonar Ranging Receiver IC.
Polaroid, "Polaroid Ultrasonic Ranging System Product Change Notice".

Primary Examiner—Glen R. Swann, III
Attorney, Agent, or Firm—Benoit Law Corporation

[57] ABSTRACT

The presence of persons in a space is sensed with the aid of ultrasonic pulses which are sent out into the space when echoes of such ultrasonic pulses are received. Echoes attributable to the floor or to parts of a door in the space are timed out, and a remainder of such echoes is employed for sensing persons in the space. For example, sliding or revolving doors may be controlled and operated with the aid of such ultrasonic echoes, and limited access to secured areas may be provided thereby.

58 Claims, 8 Drawing Figures

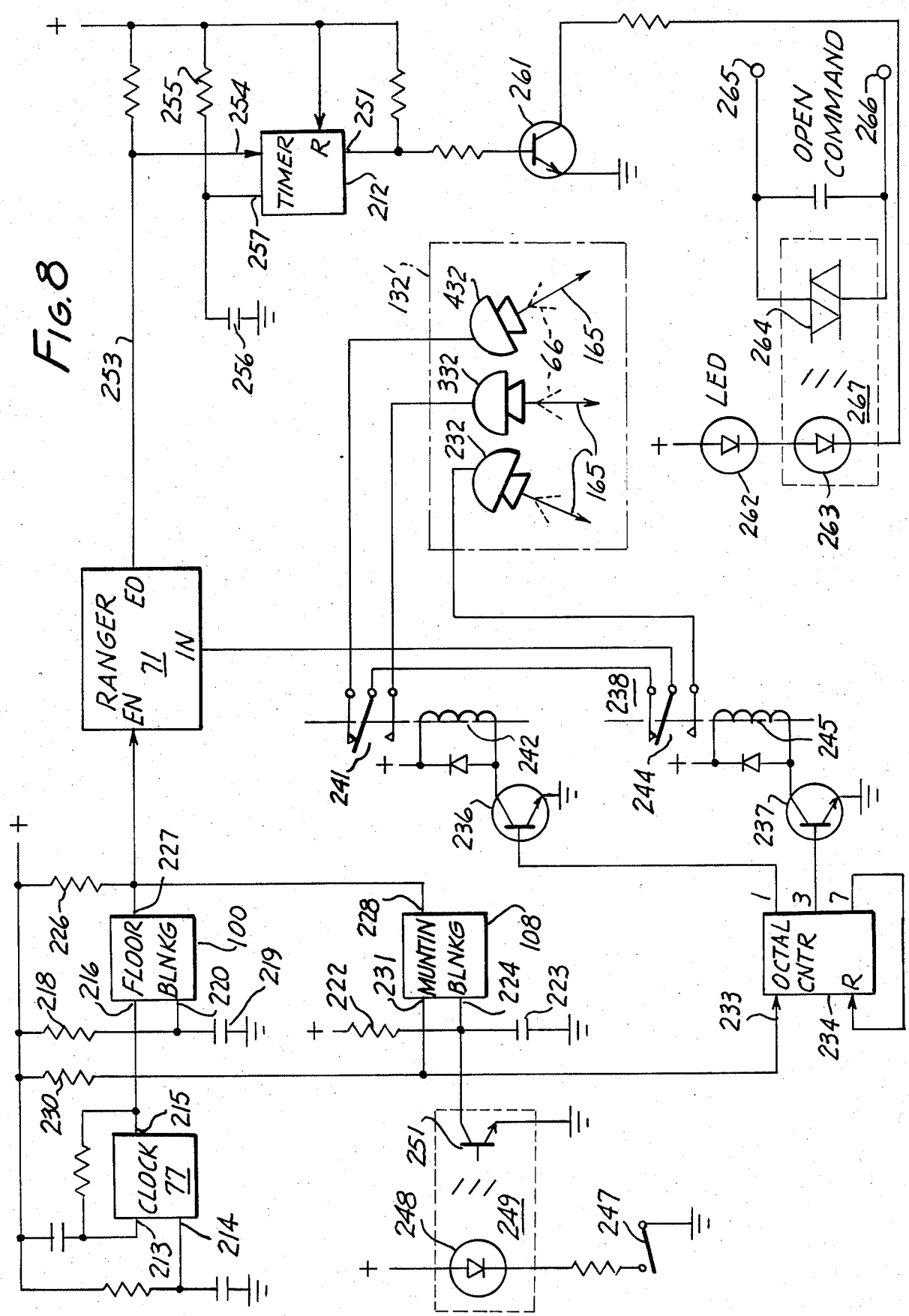

ULTRASONIC SENSING AND MONITORING SYSTEMS

BACKGROUND OF THE INVENTION

Field of the Invention

The subject invention relates to sensing and monitoring systems using ultrasonic pulses, including systems for sensing the presence of persons in a space or in or at a door, and to revolving, automatic and other door systems.

Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

The need for and utility of automatic and revolving doors and of systems for sensing the arrival or presence of persons and objects at doors or in secured spaces are well known.

Familiar sensing systems are of a doormat-type which sense, for instance, the presence of a person capacitively, in connection with an oscillator system, or simply by the closure of a contact switch embedded in the doormat. In practice, such sensing systems have a rather limited life in that the doormat is attacked by wear and tear and by many of the cleaning solutions customarily used by janitors.

Photoelectric systems are less vulnerable in this respect, but have other limitations, such as a vulnerability to spurious light incidence and a certain narrow directionality which would enable an intruder to sidestep the system in the case of photoelectric systems used at doors of supermarkets and other public establishments. Heavy doors are sometimes closed on babies who avoided the light or infrared beam of the system by crawling along the floor.

Motion detectors, such as those operating in the microwave range and being typically mounted above the door, provide a certain measure of relief in this respect. However, a motion detector cannot continue to sense the presence of a person who is no longer moving. Accordingly, an automatic door equipped only with a motion sensor may close on a person who has come to a standstill in the clearance of the door, such as for the purpose of waiting for someone or engaging in a conversation. Handicapped and elderly people, as well as children, are also vulnerable in this respect.

In consequence, safety regulations or recommendations usually require or suggest presence and operation of a second person detector, such as a photoelectric system, whenever a motion detector is used for operating a door.

These and other problems become aggravated in the case of revolving doors. For instance, intruders have successfully evaded doormat-type security systems in revolving doors by riding on or hanging from protruding ledges and pranksters have been injured in a similar manner. Photoelectric systems have not lent themselves readily to the situation of a revolving door. The same may be said for motion detection systems which are easily disturbed by the rotating leaves of revolving doors.

In 1981, Polaroid Corporation has published a brochure entitled ULTRASONIC RANGING SYSTEM, and suggesting commercial uses for a ranging system originally developed for photographic cameras. An experimental demonstration board was also available in a kit including the brochure.

In principle, such an ultrasonic ranging system is essentially free of the above mentioned wear and tear problems of doormat-type detectors and the insensitivity to stationary objects or persons of motion detector systems. Also, ultrasonic ranging systems cannot be defeated by spurious light signals or incidence and the same transducer may be conveniently employed for sending out an ultrasonic signal and receiving its echo from a particular space. On the other hand, special precautions would have to be taken in the case of ultrasonic systems to avoid spurious responses to floor or environmental objects or to parts or projections of moving door structures.

Components or ultrasonic ranging systems are also manufactured by Texas Instruments Incorporated for various applications.

In an effort to close as many loopholes in the ultrasonic pulse screen as possible, a criss-crossing of ultrasonic pulse beams was attempted. Also, attempts were made to cut off signals due to echoes from the floor below the door and from rotating door leaves outside of the ranger modules, and to project the ultrasonic pulse beam at such an angle that echoes could not return over the same angled path as the ultrasonic pulses sent out from above the door. In practice, such efforts did not provide generally applicable and operative systems.

Much of what has been mentioned above applies also to burglar and other intrusion alarm systems and to security systems for monitoring a confined space or area.

In the ultrasonic sensing and security system fields, a further problem has been that the beam of ultrasonic pulses was either too scattered or then too narrow for reliable sensing or monitoring. As far as beam width variations are concerned, the above mentioned Polaroid publication suggests on page 14 that an acoustic horn to focus the sound or an increase in transmission frequency may be employed to decrease beam width, while beam width may be increased by the use of an acoustic lens to disperse the signal, by a decrease in transmitting frequency or by the use of several transducers to span an area. In practice, such measures are only partially feasible or effective, leading either to too much scattering or leaving uncovered gaps in the monitored space.

SUMMARY OF THE INVENTION

It is a general object of this invention to overcome the drawbacks and to meet the needs expressed or implicit in the above information disclosure statement or in other parts hereof.

It is a related object of this invention to provide improved methods and apparatus for sensing the presence of persons in various spaces.

It is also an object of the invention to provide improved methods and apparatus for sensing the presence of persons in or at a door or door opening.

It is a germane object of this invention to provide improved methods and apparatus for sensing the presence of persons in revolving door structures.

It is also an object of this invention to provide improved security, limited access and monitoring systems employing ultrasonic ranging techniques.

It is a related object of this invention to provide new and useful uses for ultrasonic ranging systems.

Other objects of the invention will become apparent in the further course of this disclosure.

Contrary to prior systems, the subject invention provides a timing out principle for inhibiting or excluding echoes from such objects as floors, door leaves and door parts present in or at the space monitored with ultrasonic pulses. The time out according to the subject invention may, for instance be effected by gating out undesired echoes in a timed manner, or by temporarily suspending transmission of ultrasonic pulses that could produce undesirable echoes.

From one aspect thereof, the subject invention resides in methods and apparatus for sensing the presence of a person in a space having thereat an object capable of reflecting ultrasonic pulses, and, more specifically, comprises, in combination, the steps of, or means for sending ultrasonic pulses into said space and toward said object, suspending transmission of those ultrasonic pulses into the space which would produce echoes at the mentioned object, receiving echoes of ultrasonic pulses from said space, and sensing the person with the aid of the received echoes.

From another aspect thereof, the subject invention resides in a method of sensing the presence of a person in a space, comprising, in combination, the steps of, or means for, sending ultrasonic pulses into said space, receiving echoes of these ultrasonic pulses from said space, using these echoes for generating electric signals indicative of a person in that space, subjecting such signals to amplification, broadening an area in said space in which a person may be sensed, by increasing said amplification in gain, and indicating with these electric signals said person over said broadened area.

Other aspects of the invention will become apparent in the further course of this disclosure, and no restriction whatever is intended with this Summary of the Invention.

BRIEF DESCRIPTION OF THE DRAWINGS

The subject invention and its various objects and aspects will become more readily apparent from the following detailed description of preferred embodiments thereof, illustrated by way of example in the accompanying drawings in which like reference numerals designate like or functionally equivalent parts, and in which:

FIG. 8 is a schematic of an ultrasonic ranging, sensing and control apparatus employable in the system of FIGS. 6 and 7 and otherwise according to embodiments of the subject invention.

DESCRIPTION OF PREFERRED EMBODIMENTS

Figure 1:
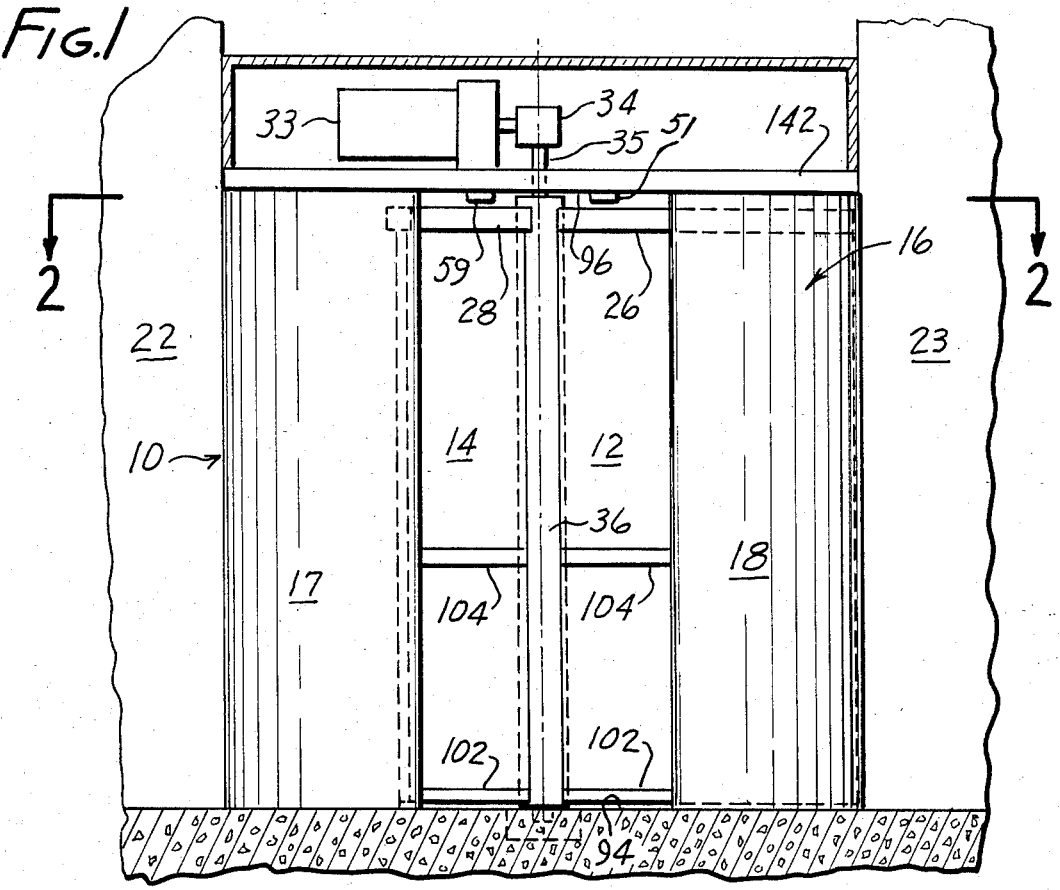
FIG. 1 is an elevation, partially in section, of a revolving door structure incorporating a preferred embodiment of the subject invention.
Figure 2:
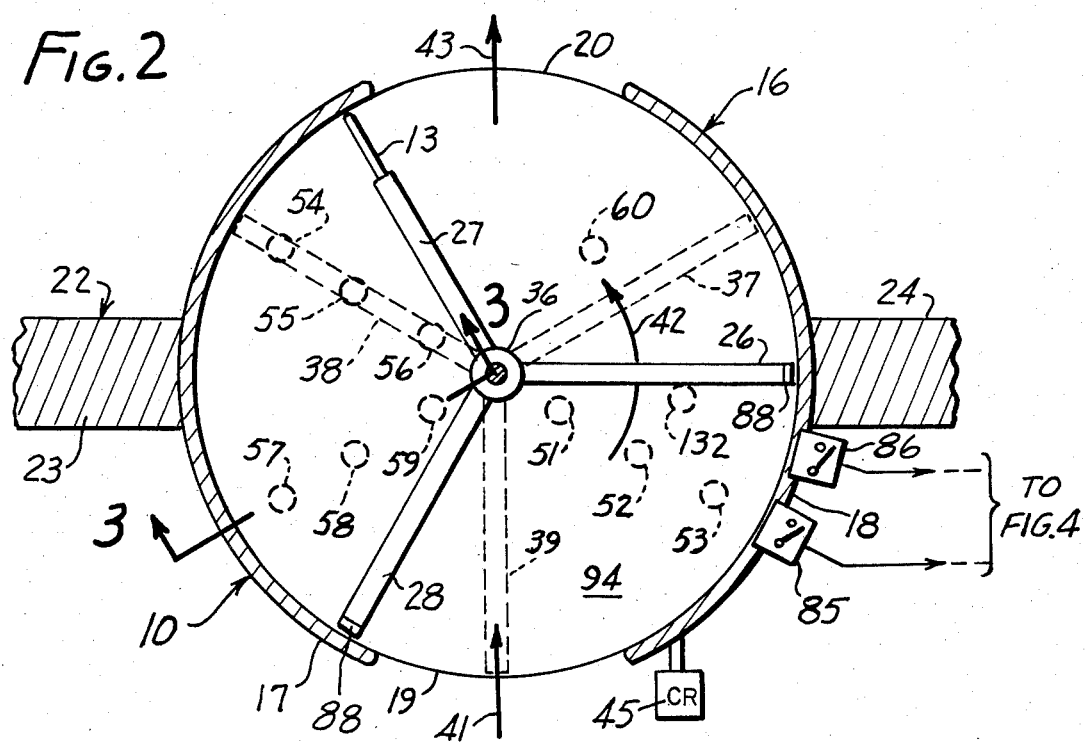
FIG. 2 is a section along the line 2—2 in FIG. 1.
Figure 3:
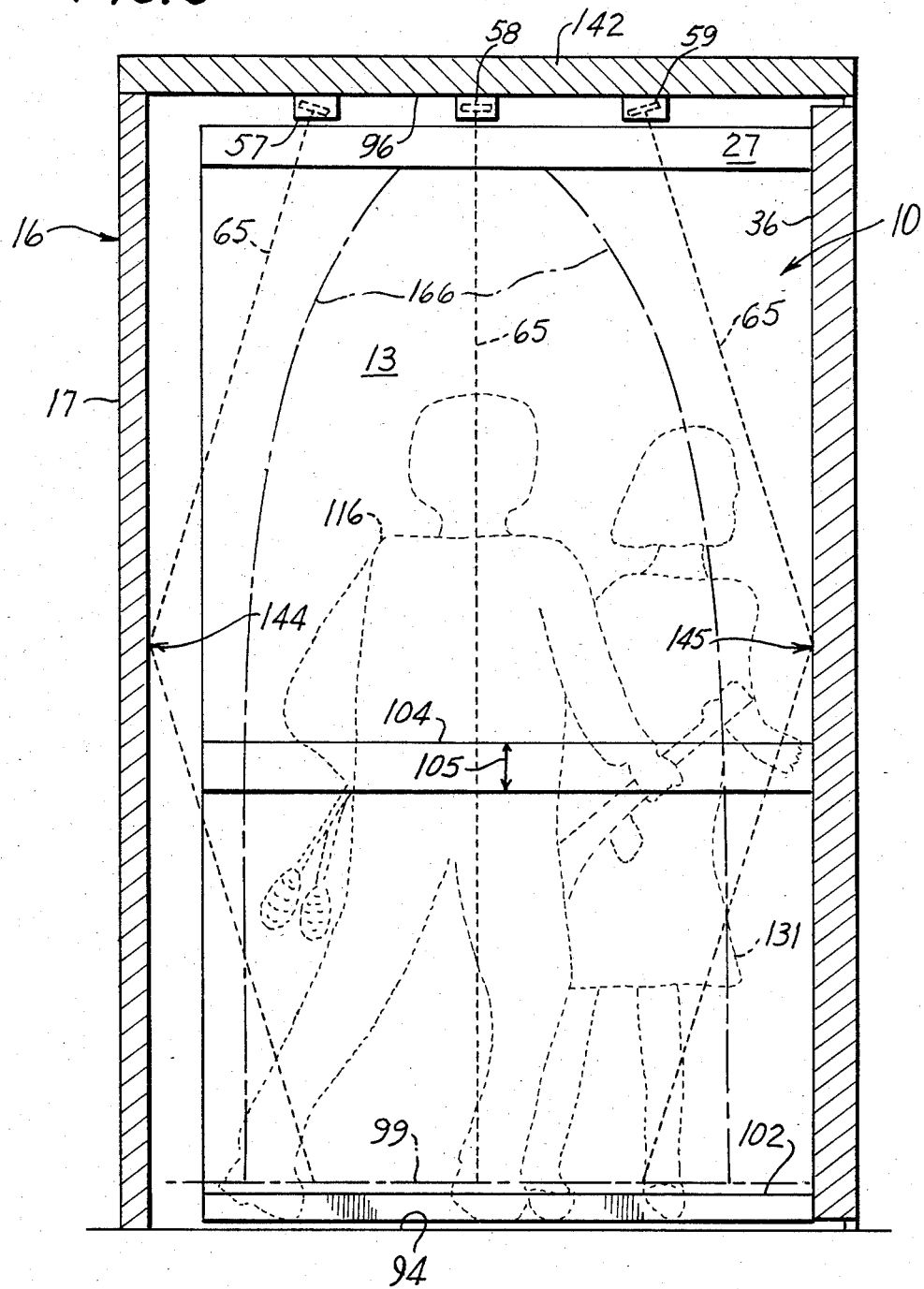
FIG. 3 is a section along the line 3—3 in FIG. 2.

The revolving door structure 10 shown in FIGS. 1, 2 and 3 has revolving door leaves 12, 13 and 14 angulary spaced from each other in an operating condition as shown in FIGS. 1 and 2. The angularly spaced leaves 12 to 14 are rotatable in a revolving door enclosure or drum 16 having enclosure wall sections 17 and 18 defining opposed inside and outside openings 19 and 20 relative to a building wall 22. In practice, that wall may include wall sections 23 and 24 of a building equipped with the revolving door structure 10. A ceiling normally present in buildings at the ground and upper floors has, however, not been shown in the drawings, since it may be of a conventional type. In the embodiment shown in FIGS. 1, 2 and 3, the revolving door has a first leaf 12, a second leaf 13 and a third leaf 14 suspended, respectively, with respect to first, second and third leaf carrier arms 26, 27 and 28 of a turnstyle-like structure 31. These first, second and third leaves 12 to 14 are rotatable with the leaf carrier arms 26 to 28 in the enclosure 16 having the opposed inside and outside openings 19 and 20 relative to the building wall 22.

For the convenience of its users, the revolving door structure 10 is equipped with an electric motor 33 for rotating the angularly spaced door leaves via a gearbox 34, shaft 35, boom 36 and leaf carrier arms 26 to 28. The door leaves may thus be rotated continuously, continually or whenever any person desires to enter or exit through the revolving door structure 10. Most advantageously, the subject invention is employed in security systems, where the revolving door admits persons only on a selective basis and/or monitors the movement of persons relative to a secured area.

On the other hand, it should be clearly understood that the subject invention and most of its embodiments are not limited to use with motor-driven revolving door structures. Rather, the utility of the subject invention extends to manually operated revolving doors as well.

As indicated by dotted outlines 37, 38 and 39 in FIG. 2, the leaf carrier arms 26, 27 and 28, respectively, and thereby the door leaves 12, 13 and 14 maintained in coincidence therewith, rotate at their mutual angular relationship within the door enclosure 16. People may thus pass, for instance, through the revolving door structure from the inside opening 19 to the outside opening 20 as broadly indicated by arrows 41, 42 and 43 in FIG. 2. The door leaf structure may thereby be rotated in the direction of arrow 42, either by the people themselves pushing against one of the door leaves at a time, or by the motor 33 rotating the door leaf structure via gearbox 34.

Conversely, the revolving door structure 10 may be part of a monitoring or similar system which controls the access of personnel to a restricted area at 20 and, if desired, the departure of people from a restricted area at 20 to another area or to the outside at 19. In that and other cases, an identification card reader 45 or other authorized personnel recognition device may be employed at either or both sides of the revolving door structure 10.

The subject invention may also be employed in the realization of one-way door systems. By way of example, the invention may be employed at airport locations and other areas where passengers are moving in one direction, but terrorists and hijackers have to be prevented from intruding in a countervailing direction.

According to a preferred embodiments thereof, the subject invention employs various ultrasonic transducers 51 to 60. While the subject invention prefers such transducers to be at least partially hidden from view, at least portions thereof are shown as projecting at 57 to 59 in FIG. 3 and 59 and 54 in FIG. 1, in order to indicate preferred transducer locations.

The subject invention is not limited to any particular ultrasonic transducer, but electrostatic transducers manufactured by or for Polaroid Corporation for its ultrasonic distance setting cameras or for its instrument grade or commercial grade ultrasonic ranging systems are presently preferred. Reference may in this respect, for instance, be had to the above mentioned brochure entitled ULTRASONIC RANGING SYSTEM P1834B 12/81, by Polaroid Corporation, and reissues and supplements thereof.

Figure 4:
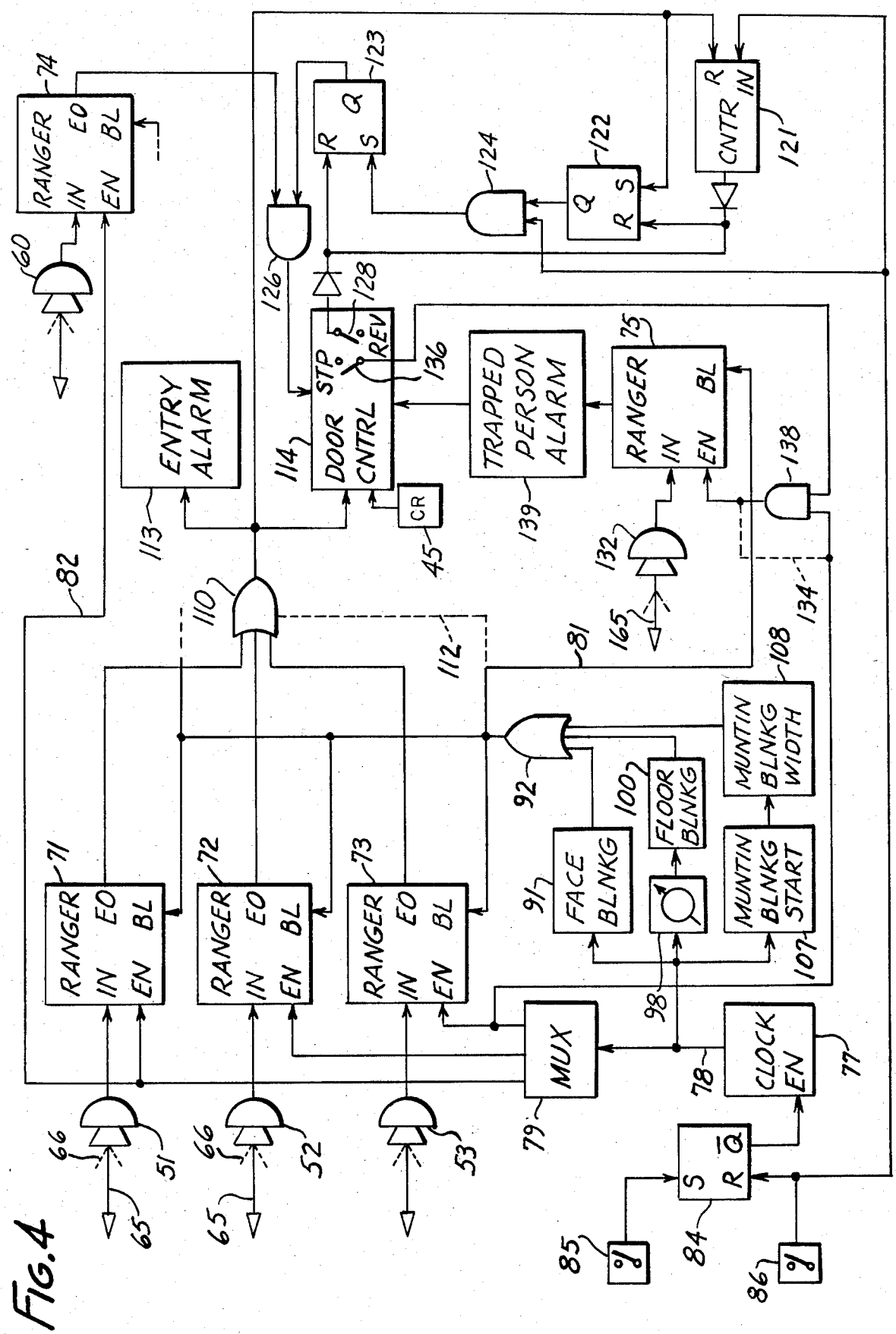
FIG. 4 is a block diagram of an ultrasonic ranging, sensing and control system embodying preferred embodiments of the subject invention.

The presently preferred type of ultrasonic transducers is actually an acoustical transceiver, in that it emits the ultrasonic acoustical signal and also receives echoes of such signal. For instance, as shown in FIG. 4 by solid arrows, the transducers 51, 52, etc. emit ultrasonic pulses 65. As shown by contervailing dotted arrowheads 66, these transducers also receive returning ultrasonic echoes. However, the subject invention is not limited to transducers in which the same parts are used for emitting and receiving ultrasonic pulses.

The ultrasonic transducers 51, 52, etc. may be of an electrostatic type, transforming electrical energy into ultrasonic waves and converting returning echoes back into electrical energy. To this end, the ultrasonic transducers have circuit board electronics associated therewith, for effecting and controlling their transmit/receive operating mode. In FIG. 4, each such circuit board bears the designation RANGER, since it effects and controls the desired ultrasonic ranging function together with its associated transducer.

By way of example, transducers 51, 52, 53, and 60 shown in FIG. 4 have ranger modules 71 to 75 individually associated therewith.

In this respect, while detection is a primary object of the systems herein disclosed, ranging is an important function according to preferred embodiments of the subject invention, achieving a time-out of echoes from floors, door leaves and door structure projections, as more fully disclosed herein.

Figure 5:
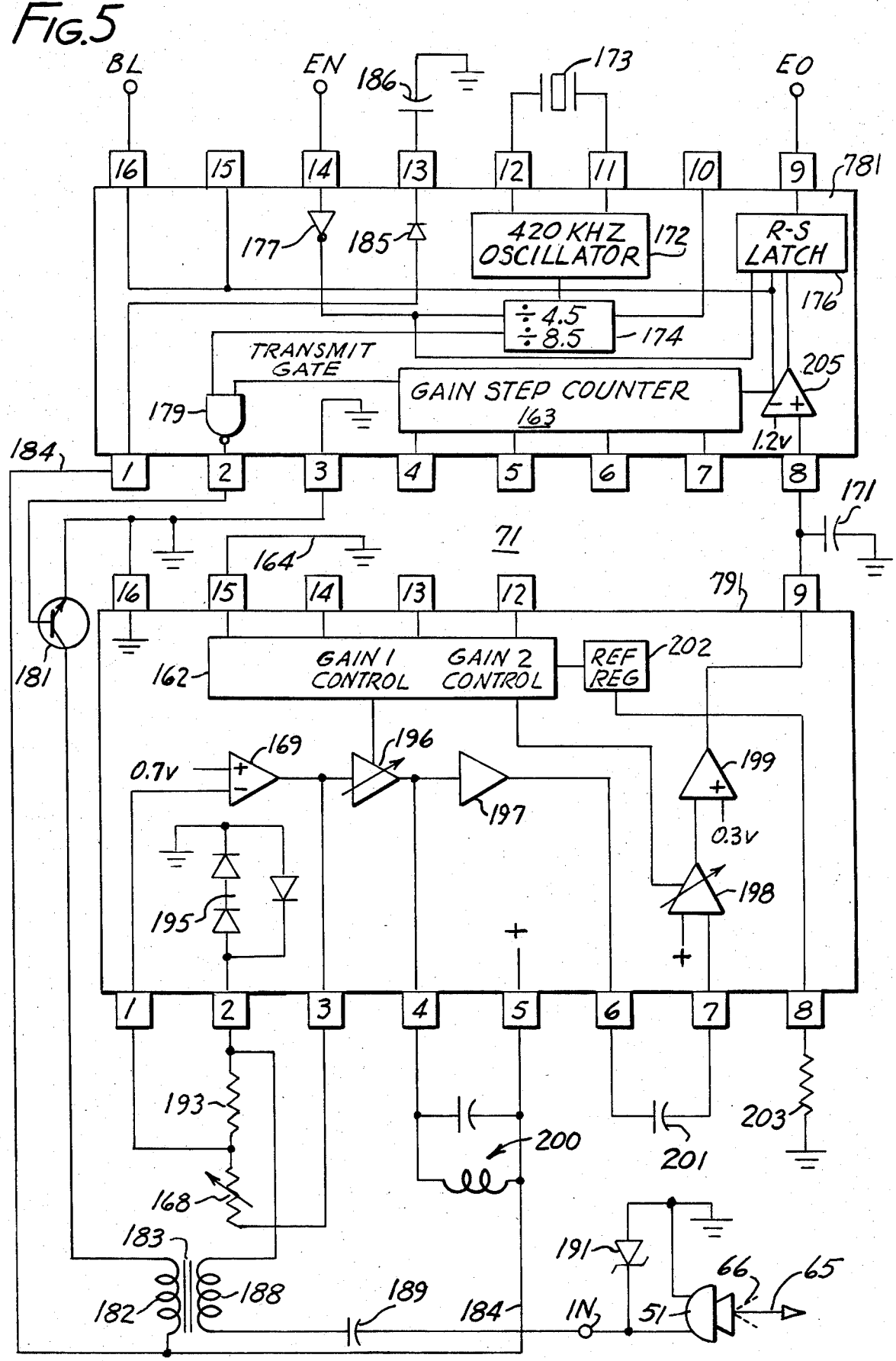
FIG. 5 is a schematic of ultrasonic ranging apparatus employable in the system of FIG. 4.

A block and circuit diagram for ranger module 71 is shown in FIG. 5. By way of example, that module employs the Ranging Module PCB SN28827, including at 78 a sonar ranging control IC SN28826, and at 79 a sonar ranging receiver IC SN28825, by Texas Instruments Incorporated.

As seen in FIGS. 4 and 5, the ranger 71 has a pair of terminals labeled IN through which electric energy pulses are administered to the transducer 51 for an emission of ultrasonic pulses 65, and through which electric signals representing echoes received by the transducer 51 are applied to the same ranger module.

The ranger 71 also has a terminal labeled EN for the reception enabling pulses, and a terminal labeled BL for blanking purposes. The electric output of the ranger 71 is labeled EO.

It will be noted in this respect from FIG. 4 that the other rangers 72, 73, etc. have like terminals of their own. Each ranger with its transducer connected thereto may be viewed as an ultrasonic unit. The embodiment of the invention illustrated in FIG. 4 has an electronic clock 77 which provides the operating oscillation needed by the ranger modules 71, 72. etc. In particular, the clock 77 may be of a conventional free running type, providing at a clock output 78 a free running square wave oscillation or clock output at 78.

In principle, the clock output could be applied simultaneously to the enable terminals EN of all or several ranger modules 71, 72, etc. However, since the ranger modules typically draw large transient currents during pulse transmission, the clock output preferably is distributed by a multiplexer 79 to the various ranger modules. In this manner, transient current draw on the power supply and crosstalk between different ultrasonic ranging systems are effectively inhibited.

As shown with respect to multiplexer 79 in FIG. 4, a couple of ranger modules 73 and 75 or 71 and 74 (see line 82) may, however, be enabled simultaneously by the clock output.

The clock illustrated in FIG. 4 is of a conventional type that may be enabled by the output of a set-reset flip-flop 84. To this end, a first sensing switch 85 is connected to the S-input of the flip-flop 84, and a second sensing switch 86 is connected to the R-input of that component.

The switches 85 and 86 are positioned for sensing the passage of any door leaf at a set of transducers, such as the transducers 51 to 53 shown in FIG. 2. To this end, the door leaf suspension 26, for instance, may include a permanent magnet 88 for sequentially actuating the switches 85 and 86 during passage of a door leaf relative thereto. Of course, for that and any other door leaf magnet to be effective, the switches 85 and 86 need to be Hall effect or other magnetically actuable switches. In practice, the actuating magnets need not be located on the door leaves or door leaf suspensions themselves. Rather, a small-scale replica of the door leaf suspension 26 to 28 may be provided on the shaft 35 for sequentially actuating the door leaf passage sensing switches 85 and 86. In practice, such replica may have the form of a turnstile having as many arms as the number of door leaves 12, 13, 14 as the particular revolving door. For instance, the turnstile would have three arms for the door illustrated in FIGS. 1 and 2, but would have four arms for the familiar four-leaf type of revolving door. The angular position of the arms of such turnstile would correspond to that of the particular door leaves, but would at any rate be such that the clock 77 is deactivated each time a door leaf passes a set of ultrasonic transducers 51 to 53, 54 to 56, 57 to 59 and 60. As partially indicated at 88 in FIG. 2, each arm of the turnstile has a magnetic or other agency for sequentially actuating set and reset switches 85 and 86 during its passage thereof, as the mentioned turnstile device on the shaft 35 or boom 36 rotates simultaneously with the door leaves of the revolving door.

Since the clock 77 thus interrupts its application of clock pulses to the EN inputs of the ranger modules 71, 72, etc. the transducers 51, 52, etc. actually cannot "see" any door leaf passing them.

The presently discussed aspect of the subject invention thus inhibits or times out echoes from any door leaf of the revolving door structure 10. In the illustrated preferred embodiment of the invention, this is done by interrupting the sending out of ultrasonic pulses whenever a leaf of the rotating door structure is moved past the location where the particular transducers 51, 52, etc. are located.

The components including the flip-flop 84 and its set-reset proximity switches 85 and 86 thus form for the clock 77 a sector enable signal which, applied to the EN input of clock 77, enables the particular transducers 51, 52, etc. to scan with their ultrasonic pulses the space within each sector of the revolving door structure between adjacent door leaves.

The clock 77 is free running, when not disabled by the flip-flop 84 via its EN input. On the other hand, according to the illustrated preferred embodiment, the clock signal itself is employed for ultrasonic signal blanking purposes.

By way of example, monostable multivibrator circuitry 91 may be employed for blanking out the operation of the ranger modules for an instant at the beginning of each enable cycle, so as to blank out noise inherent in the startup of the transducers, sometimes referred to as "face noise."

In particular, the enabling clock signal appearing at 78 triggers the multivibrator circuitry 91 which, in turn, issues a blanking pulse through an OR element 92 to the blanking inputs BL of the ranger modules 71, 72, etc. In this manner, each ultrasonic unit operates only in its noise-free range of operation.

Another source of noise and undesired echo signals is the floor 94 at the bottom of or below the door or door structure. Accordingly, the currently discussed aspect of the subject invention provides methods and means for timing out echoes attributable to such floor. In the illustrated preferred embodiment, this is done by determining the time of travel of the ultrasonic pulses 65 from the location 96 of the transducers 51, 52, etc. to the floor and back and timing out echoes arriving at such location 96 at and after occurrence of such travel time shortened by the predetermined tolerance disclosed below with the aid of levels 99 shown in FIGS. 3 and 6.

To that end, the circuitry shown in FIG. 4 includes an adjustable timer 98 by means of which the time of travel of an average ultrasonic pulse from the top location 96 to a level 99 located somewhat above the floor 94 and back is set. In FIG. 3, the level 99 is shown horizontally parallel to the floor 94. However, since the outer pulses 65 proceed at angles to the vertical, that level 99 may in practice be somewhat concave toward the center of the door sector. Also matters of temperature variations and component tolerances are taken into account when setting the floor blanking level 99 somewhat above the actual floor 94. The set timer 98 reacts to the leading edge of each clock pulse in energizing a monostable multivibrator circuitry 100 after a time delay corresponding to a somewhat reduced distance between the ultrasonic transducer location 96 and the opposite reflective surface 94.

As its name implies, the floor blanking monostable multivibrator circuitry issues a pulse through the OR element 92 to the blanking inputs BL of the ranger modules 71, 72, etc., so that echoes from the floor 94 are positively timed out. In the illustrated preferred embodiment shown in FIG. 4, such timing out takes the form of an elimination of echo signals through blanking.

The illustrated preferred embodiment inhibits all echoes from the door or door leaves, including echoes from door projections. In this respect, the bottom ledge 102 of any door or door leaf can readily be handled by the timing and floor blanking circuitry 98 and 100 which, in effect, would set the level 99, beyond which echoes are rejected or timed out, at a level above the door bottom ledge 102, as seen from the floor 94.

On the other hand, many doors have projections located considerably above the floor. For instance, as indicated in FIG. 3, revolving door leaves, or even ordinary doors, may have a push bar 104 at a level where a person's hands are usually located. In this respect, the bar 104 need not necessarily be a manual push bar, but may be a mullion or muntin, which typically is a strip member separating panes of glass with a sash. Especially in motor-driven revolving doors, the projecting strip 104 typically will be a muntin and will, therefore, be referred to herein as such.

The illustrated preferred embodiment determines the presence of projection 104 on the door or door leaf, and times out echoes from such projections.

In particular, the embodiment of the invention currently being discussed, determines the presence and location of a projection 104 on the door or door leaf, determines a width 105 of that projection in a direction in which ultrasonic pulses 65 are sent, and times out echoes of such ultrasonic pulses for a period corresponding in timing to the location, and in duration to the width 105, of that projection 104.

In this respect, FIG. 4 shows a first monostable multivibrator circuitry 107, labeled *Muntin Blanking Start*, and a second monostable multivibrator circuitry 108 labeled *Muntin Blanking Width*. As its name implies, the muntin blanking start circuitry 107 reacts to each leading clock pulse edge by issuing to the second circuitry 108 a pulse representative of the start of the projection 104 as seen from the ultrasonic transducer location 96. In practice, that muntin blanking start circuitry 107 is set to allow for temperature variations and component tolerances in its indication of the position of the projection 104. The muntin blanking width circuitry 108, in turn, is set to respond to the pulse from the circuitry 107 by issuing through the OR element 92 a blanking pulse to the ranger modules 71, 72, etc., at such time and for such duration as to time out any ultrasonic echo for a duration of time corresponding liberally to the width 105 of the projection.

In practice, there are at least three ways of timing out undesired echoes. For instance, all echoes could be permitted to occur, with undesired echoes then being gated out, such as by way of a controlled gate at the location of the gate 110 shown in FIG. 4.

For example, as shown by the dotted line 112 in FIG. 4, the output of the blanking OR element 92 could be connected to a gated OR element 110, rather than to blanking inputs of the ranger modules. In that case, echoes occurring at the floor 94 or level 99, at the ledge 102 and at the muntin 104 would simply be gated out, and the remainder of the echoes from the transducers 51, 52, etc. would be used for sensing a person at the door or in the revolving door structure. Another alternative is illustrated in FIG. 8, where clock pulses to a ranger module are sequentially disabled and enabled in order to inhibit echoes by suspending transmission of those ultrasonic pulses into the door space which would produce echoes at the floor 94, muntin 104 or other object.

In principle, undesired echo signals could all be eliminated by gating the output OR element 110, or a latch or gate in each ranger module, so that undesired echo signals are suppressed. However, selective enablement and disablement of the clock is preferable when this promotes inhibition of secondary echoes and noise generation. In this respect, the output of the OR element 92 containing face blanking, floor blanking and muntin blanking signals, could be connected to the EN input of the clock 77, if necessary through an inverter, so as to disable the clock whenever inhibition or elimination of an echo pulse or suspension of ultrasonic signal transmission is desired. Conversely, the door leaf sensing circuitry 84 to 86 could be made to bear on the blanking inputs BL of the ranger modules.

It should thus be realized that the words "eliminating" and "timing out" are used in a broad sense herein, extending to such concepts as "inhibiting" and "suppressing."

Within the scope of the subject invention, the suspension of transmission of ultrasonic pulses or any other inhibition of echo signals whenever a leaf of the rotating door structure is moved past the particular transducer location, may be rendered bidirectional, such as by insertion of a double-pole double-throw switch or its electronic equivalent between the proximity switches 85 and 86 and the set and reset inputs of the flip-flop 84. In other words, the timing out of echoes from sweeping door leaves may readily be rendered effective in either direction of rotation of the revolving door.

In a basic form thereof, the circuitry so far described by reference to FIGS. 1 to 4 may be used as a kind of ultrasonic doormat, without, however, incurring the initially mentioned drawbacks of prior-art doormats with embedded electrical contacts. In other words, the transducers 51, 52 and 53 shown in FIGS. 2 and 4, and their associated circuitry also shown in FIG. 4 could be employed for checking whether any person is going through the door. In some installations, such a determination alone is already sufficient for the particular purpose, such as the switching on of lights inside a building or the actuation of an indicator for the benefit of a guard or other monitor.

In instances where two or more transducers are associated for scanning the same space for essentially the same person, the output of their associated ranger modules may be made to bear on the same control or alarm system.

For example, as shown in FIG. 4, the outputs of the ranger modules 71 to 73 are applied through an OR element 110 to a false entry alarm 113 and a door control 114. As already indicated, the entry alarm 113 may simply be an indicator of the passage of any person. However, once unauthorized persons are to be distinguished from authorized personnel, a door control is practically inevitable. Accordingly, if the entry alarm 113 is a false entry alarm, then the output of the particular ranger modules usually is also applied to a door control 114. The door control may in principle be of a conventional type, selectively energizing and deenergizing the revolving door motor 33, and even reversing same, as desired.

For instance, the transducers 51 to 53 could be located outside the door structure, so as to perceive when a person is present and presumably wishes to enter through the door, as is the case in the illustration of FIG. 6, to be more fully discussed below. The same entering person sensing function could, of course, be effected in the case of any revolving door structure, such as the one shown in FIGS. 1 to 3.

Figure 6:
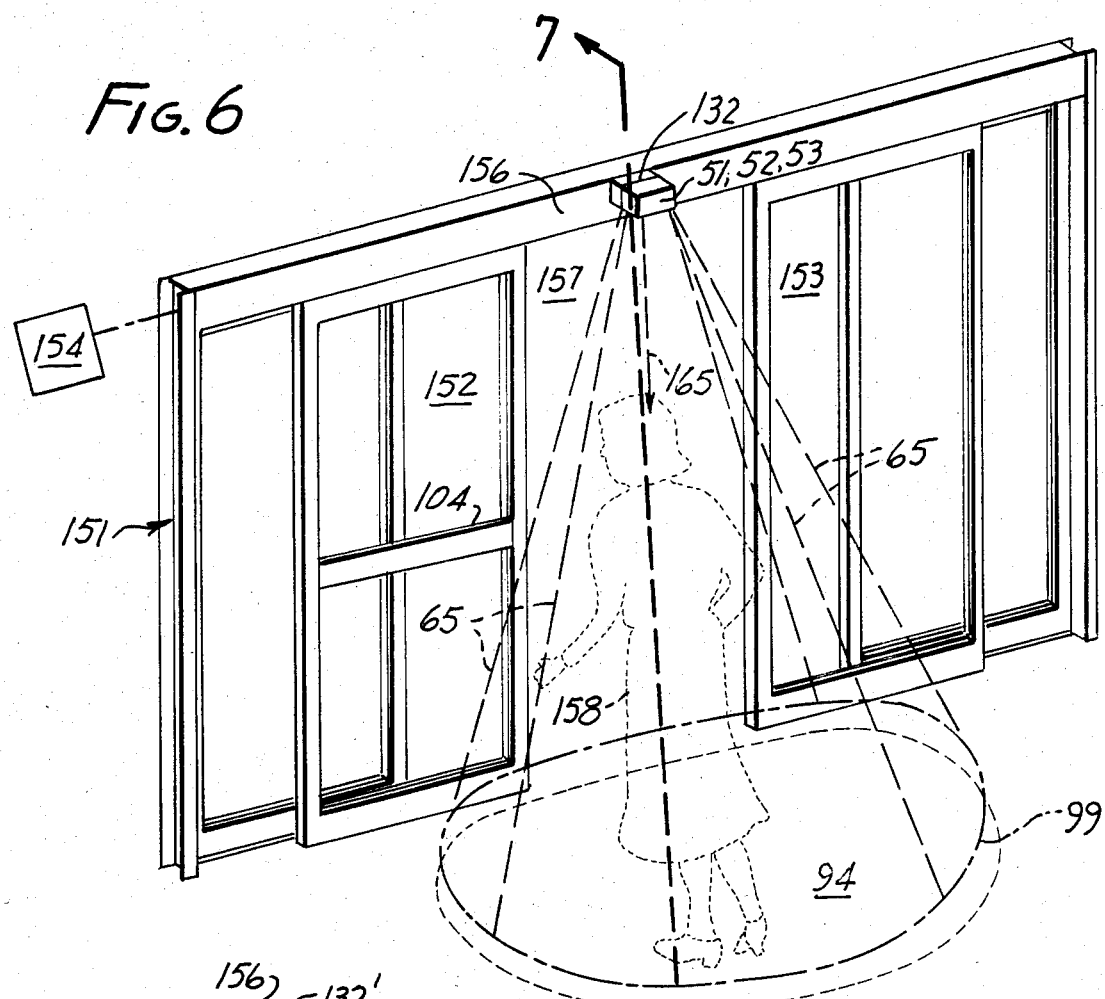
FIG. 6 is a perspective view of a sliding door structure equipped with an ultrasonic sensing system according to an embodiment of the subject invention

In either case, the echo signal generated by the presence of a person would actuate the door control 114 so as to open the door in the case of an installation of the type shown in FIG. 6, or so as to start rotating the revolving door via the drive motor 33 shown in FIG. 1. At the same time, each entering person may be counted or indicated in any manner, such as by an entry alarm or indicator 113.

Conversely, all or some of the ultrasonic transducers and their associated circuitry may be employed for indicating the attempted passage of an unauthorized person. For instance, a card reader 45 may be employed as shown in FIGS. 2 and 4 in order to distinguish between unauthorized persons and card-carrying authorized personnel. For instance, the transducers 51 to 53 and the card reader 45 may be positioned near the door entrance 19, and the card reader may be of a conventional type issuing a continuous signal as long as no authorized card has been received therein. An AND element (not shown) may in that case be employed at the input of the door control 114, so as to cause that door control to stop the rotation of the revolving door in response to simultaneous signals from the ranger modules 71 to 73 and the card reader 45. On the other hand, if the card reader signifies receipt of an authorized card by interruption of its signal to the door control, then the mentioned AND function cannot take place and the echo signals from the ranger modules 71 to 73 are not able to stop the rotation of the revolving door via the door control 114.

In some restricted areas, there is a continual flow of persons which is tolerated in only one direction. To give an illustrative example, security systems at many airports permit passengers to move in one direction, while disallowing any movement in an opposite direction. In fact, any attempted movement in an opposite direction usually is an indication in such security monitoring cases that possible hijackers or terrorists are attempting to intrude the system.

In this respect, let us assume for the moment with reference to FIG. 2 that airline passengers who and whose carry-on belongings have been screened are permitted to move through the revolving door to or from departing or arriving aircraft. In that case, the illustrated sensors 51 to 53 may not be necessary. However, the transducers 57 to 59 shown in FIG. 2 may then operate in conjunction with their associated circuitry as an ultrasonic doormat, preventing the intrusion of persons in a countervailing direction. For instance, as indicated in FIG. 3, one or more hijackers or terrorists 116 could try to move through one half of the revolving door, while screened passengers are proceeding through the other half. In terms of FIG. 4 the transducers 51 to 53 may be considered as being replaced by the transducers 57 to 59 for operating with the ranger modules 71 to 73 in the manner set forth above for the transducers 51 to 53. Accordingly, if an unauthorized person 116 enters the door in a countervailing direction, he or she will be picked up by echoes of ultrasonic signals emitted by transducers 57 to 59. Spurious floor, door leaf and door projection signals are again timed out or inhibited as disclosed above by reference to FIG. 4. However, the remaining echoes indicating the presence of a person in the particular door sector are applied by the ranger modules to the entry alarm and door control 114 in the manner disclosed for the ranger modules 71 to 73 in FIG. 4.

Since echoes from any of the transducers 57 to 59 signify the presence of an unauthorized person in our example, the door control typically will stop the revolving door in response to any echo from these transducers. In practice, this may be done by deenergizing the motor 33.

If a worm gear or an electric brake is employed at 34, this may be sufficient to prevent a further progress of the unauthorized person 116 through the door. On the other hand, the door control 114 may be of a conventional type capable of reversing the direction of rotation of the door drive 33. In that case, an unauthorized person may be ejected by a reversal of the sense of rotation of the door in response to echo signals from an area where only unauthorized persons can normally be present. A similar ejection of unauthorized personnel may be effected if any of the transducers 51 to 53 senses the presence of a person for which no proper identification card has been inserted in the card reader 45.

In practice, card readers may be positioned at both the door opening 19 leading through the revolving door to a secured area, and at the opening 20 leading from such secured area into the revolving door. In that case, further transducers 54, 55 and 56 may be provided for covering persons leaving a secured area. The card reader or revolving door installation may then be combined with a system that records the time and access of each person on the basis of his or her personal indicia on the particular ID card. Passage of more then one person on the same card may also be inhibited.

Further precautions may be taken to avoid situations in which a person will abstain from going through the door, after having inserted his or her ID card into the reader. In that case, there is a danger that another person may then pass through the door without proper identification. To prevent that and other incidents, the ultrasonic ranging system according to the subject invention may be expanded to monitor the passage of each authorized person through the revolving door. To this end, fourleaf revolving door structures are generally preferred, but the principle is also workable with three-leaf systems of the type shown in FIG. 2.

In either case, further ultrasonic transducer means 60 are positioned as indicated in FIG. 2 near the door exit 20, in addition to the transducers 51 to 53 shown near the door entrance 19. In practice, what has been shown in FIGS. 2 and 4 as a transducer 60 associated with a single ranger module 74 may in reality be a set of transducers similar to the transducers 51 to 53 cooperating with individual ranger modules in the manner shown in FIG. 4.

If a person is first detected by the system including transducers 51 to 53 as having made an authorized entry, a counter 121 is reset and a set-reset latch 122 is set with the detected echo signals proceeding from any of the ranger modules 71 to 73. The counter 121 then counts the number of door leaf passages necessary for the progress of an authorized person between door openings 19 and 20 and also resets latches 122 and 123.

In the case of a four-leaf door, the counter 121 may count up to a higher count than in the case of a three-leaf revolving door, where the count may be one less for an authorized person to proceed through the door. In either case, the particular pulse or pulses of the departing door leaf proximity switch 86 are applied to the IN input of the counter 121, which resets latches 122 and 123 after the requisite number of door leaf passages has been counted.

A person passing at 51 to 53 sets the latch 122 by means of echo signals proceeding from any of the ranger modules 71 to 73 to the S input of latch 122.

The set latch 122 and a concurrent signal from the second proximity switch 86 cause an AND element 124 to set a further latch 123, indicating that a person is proceeding in the revolving door toward the transducer or transducers 60.

The ranger module 74 of the transducer means 60 is enabled and blanked in the same way as the previously described ranger module 71. In addition, the ranger module 74 receives echo signals from the transducer 60, indicating the presence of a person at the location indicated for the transducer 60 in FIG. 2. The echo signal output of the ranger module 74 and the output of the latch 123 are applied to an AND element 126 which thus verifies passage of an authorized person through the revolving door. The resulting passage verification signal may also be applied to the door control, so as to sustain its continued energization of the door drive 33 for a completion of the rotation of the door so that the authorized person therein may exit through door opening 20.

By that time, the next door leaf sweeps past the proximity switches 85 and 86, thereby incrementing the counter 121 by a further step, which resets the latches 122 and 123 for the next authorized passage verification cycle.

As shown in FIG. 4, the latches 122 and 123 are also reset if closure of a switch 128 indicates that the revolving door is being rotated backwardly, the implication being that an unauthorized person is either being ejected by a reverse rotation or is trying to push the door backwardly. In this manner, and also if the transducer means 60 and ranger module 74 fail to sense the passage of a person through the door, the element 126 will be unable to provide the authorized passage signal requisite for a continued rotation of the door. In such a case, the door control advantageously may reverse the rotation of the door via the door drive 33, so that no unauthorized person can go through the door. This is particularly important in the above mentioned case, where an authorized person inserts his or her card into the reader, but then steps away from the door, thereby creating the risk that an unauthorized person may follow up on the then authorized rotation of the door.

Another mischief that may be practiced with revolving doors is the attempted entry of two persons with one card. For instance, a well-meaning authorized person could be talked into permitting another to pass with him or her through the revolving door. Alternatively, as illustrated in FIG. 3, the terrorist or hijacker 116 could force a hostage 131 through the revolving door with him or her.

In such cases, it is an easy matter for the ultrasonic sensor units of the subject invention to check the number of persons that are passing a given set of transducers for each sweep of any door leaf and to act on such information, such as by preventing further rotation of the door or by expelling the intruder therefrom.

Ultrasonic transducer units according to the subject invention may also serve as trapped person detectors. In this respect, FIG. 2 shows a further ultrasonic transducer 132 positioned so as to detect echoes from a sector of the revolving door structure between sets of entry and exit transducers. The trapped person detecting transducer 132 operates with a ranger module 75, which may be blanked in the same manner as the modules 71, 72, etc.

In principle, as indicated by the dotted line 134, the further ranger module 75 may also be enabled in the same manner as the ranger module 73, for instance. However, the preferred embodiment illustrated in FIG. 4 activates the trapped person detector only when the revolving door is standing still. Accordingly, the door control 114 is provided with a switch 136 which closes or otherwise provides a signal when the rotating door has reached a standstill. Switches which supply a signal upon standstill of a normally rotating shaft, such as shaft 35, are well known in various fields, including the tape recorder art where they, for instance, indicate when the shaft of one of the tape reels has stopped rotating.

The enable signal from the clock 77 and multiplexer 79 thus has to coincide with a signal from the stopped door switch 136, energizing an AND element 138 into enabling the ranger module 75. If then, in addition, the transducer 132 picks up a signal from a person within the stopped door, the ranger module 75 activates a trapped person alarm 139. That alarm thus supplies an indication that a person is trapped in the revolving door structure.

Appropriate remedial action may then be taken. For instance, the revolving door may be rotated backwards for a sufficient amount as to urge the trapped person back to the entrance opening 19 and preventing him or her from reaching the door exit opening 20.

Counting means similar to those shown at 121 in FIG. 4 may be employed to count not only door leaf passages, but to count also the number of persons passing a set of transducers, such as the transducers 57 to 59, between adjacent door leaf passages. In this manner, it may be determined whether more than one person is trying to pass through the door on one and the same ID card. In terrorist or hostage type of situations, a person count would give security people usefull information at a safe distance.

These are only a few examples of the broad utility and the large variety of applications of the subject invention and its various aspects and embodiments.

According to the preferred embodiment illustrated in FIGS. 1 to 5, ultrasonic pulses 65 are sent out from a location 96 above the rotating door leaves only into spaces between such leaves 13, 14, etc. In the embodiment specifically shown in FIG. 3, first ultrasonic pulses are sent out from a transducer 58 above the rotating door leaves into spaces between such leaves, and echoes of such first ultrasonic pulses are received, preferably by the same transducer 58. A ceiling 142 acts as a means for mounting the transducer 58 and other transducers above the rotating door leaves.

Transducer 57 sends out second ultrasonic pulses 65 from the above the rotating door leaves for angular deflection as an enclosure 17 of the rotating door leaves, as seen at 144 in FIG. 4 and receives echoes of such ultrasonic pulses. Signals of echoes emanating from the floor 94, as well as echoes from the muntin 104, are timed out or inhibited from occurring, and the presence of one or more persons in the revolving door structure is sensed from a remainder of the echoes of the mentioned first and ultrasonic pulses, as disclosed above with the aid of FIG. 4.

A transducer 59 sends out third ultrasonic pulses from above the rotating door leaves for angular deflection at the center post 36 of the rotating door leaves, as shown at 145 in FIG. 3, and receives echoes of such third ultrasonic pulses. Floor and muntin echoes are also timed out or inhibited with respect to these third ultrasonic pulses, and the presence of persons in the revolving door structure is sensed with a remainder of echoes of the third ultrasonic pulses.

As indicated in FIG. 3 in dotted lines, the ultrasonic pulse emission and echo receiving diaphragm of the central transducer 59 may extend in parallel to the floor 94, and the diaphragms of the lateral transducers 57 and 59 may be slanted outwardly and inwardly, respectively, so as to provide for the ultrasonic pulse and echo reflections indicated at 144 and 145 in FIG. 3.

Not all three transducers need to be employed in every installation, but more than the three transducers shown in FIG. 3 may be employed for wide door structures or more elaborate sensing or scanning tasks.

In general terms, where first ultrasonic pules 65 are sent out from one location, such as the location of the transducer 58, then further ultrasonic pulses may be sent out from at least one further location, such as the location of the transducer 57 or the location of the transducer 59, and the mentioned timed-out-less remainder of echoes of the first ultrasonic pulses and echoes of ultrasonic pulses from the mentioned further location may be employed for sensing a person at or in the door. As shown in FIG. 4 at 110, the first, second, third and further echoes of ultrasonic pulses from the different transducers are employed disjunctively for sensing a person at the door which produces echoes from only one or less than all ultrasonic pulse beams. In this manner, a person will be sensed even if he or she produces an echo of only one of the first, second, etc. ultrasonic pulses.

A further example of the versatility of the subject invention is shown in FIG. 6, illustrating a sliding door structure 151 of the familiar type used in supermarkets and other installations. The door structure 151 has a pair of sliding doors 152 and 153, which are alternatively moved toward each other for closure of the door, and away from each other for opening the door, by a conventional sliding door drive 154.

One or more of the transducers 51, 52 and 53 may be mounted at a location 156 above the door or door opening 157. With the aid of ranger modules, such as those shown at 71, 72, etc. in FIG. 4, ultrasonic pulses are sent out from the location 156 above the door, and echoes of such ultrasonic pulses are received at that location 156. Echoes emanating from the floor 94 and from any muntins 104 or similar door projections are again timed out or inhibited, preferably in the manner disclosed above with respect to the ranger modules shown in FIG. 4.

Typically, the door shown in FIG. 6 will initially be closed with the door leaves or panels 152 and 153 being in immediate proximity to each other. When a shopper or another person 158 approaches the door structure 151, his or her presence will be sensed by ultrasonic pulses 65, in the manner described above with reference to FIGS. 1 to 5. In this case, the door control 114 may act on the sliding door drive 154, causing the door panels 152 and 153 to slide away from each other for an opening of the door.

The sensed person 158 may then walk through the door opening 157. In practice, a person will sometimes come to a standstill in the door opening. Familiar examples of such occurrences are one shopper waiting for another shopper approaching the store from the parking lot or playful children acting out their fascination with automatic doors. Unfortunately, such everyday occurrences have frequently led to accidents, in that children or even adults have been hurt by automatic doors closing on them. Edge strip sensors have only been of limited value in many situations, since people and particularly small children still can get hurt, even if an edge strip sensor is employed.

In order to overcome this problem, the embodiment of the invention shown in FIG. 6 sends out further ultrasonic pulses 165 from the location 156 above the door into the door opening 157, and receives at such location 156 echoes of ultrasonic pulses sent into that door opening. As before, all echoes emanating from the floor 94 are timed out or inhibited, and the presence of any person 158 or of any object in the door opening 157 is sensed with a remainder of echoes of the further ultrasonic pulses 165. As indicated in FIG. 4, such pulses 165 may be emitted by the transducer 132, described in its nature and function already in connection with FIGS. 1 to 4.

In particular, that further transducer 132 and its associated circuitry may be equivalent to the trapped person ranger module, alarm and circuitry disclosed at 75 and 139 in FIG. 4. In some installations the stopped person feature disclosed with the aid of transducer 132 may be employed in conjunction with a conventional control of the door, in which case the further pulses 165 may in fact be the only ultrasonic pulses.

The stop switch 136 shown in FIG. 4 is not necessary as such in the installation of FIG. 6, and the AND element 138 may thus be bypassed or eliminated as indicated by the dotted line 134 in FIG. 4. However, it is presently preferred that the stop switch 136 be a switch which is closed while the door structure 151 is in its closing mode. This can be easily accomplished since the door control 114 and sliding door drive 154 naturally discern between door opening and door closing motions, as executed by the door drive. Accordingly, if the further transducer 132 senses the presence of a person 158 or object in the door opening 157 while the door panels 152 and 153 are sliding towards each other, then the further ranger module 75 will release a trapped person alarm 139. In practice, this need not necessarily be an audible alarm. However, the door structure is preferably arrested in response to the mentioned echoes from the further ultrasonic pulses 165. Such stopping or arrestation of the door may, for instance, be accomplished by applying the trapped person alarm 139 to the door control 114 in a conventional manner which stops the door drive 154 from moving the panels 152 and 153 any further towards each other. Pursuant to familiar practice, the door drive 154 may then also be reversed, so that the door panels 152 and 153 reopen whenever a person dwells in the door opening 157.

If desired or necessary, a safety feature similar to that disclosed above with the aid of transducer 60 and ranger module 74 may also be employed in the embodiment of FIG. 6. In that case, the counter 121 shown in FIG. 4 would, however, not count passing door leaves, as in a revolving door structure, but rather would time the passage of a person 158 through the door opening 157, so that the trapped person alarm 139 need only be activated if a person takes more than a customary time in going through the door opening.

As with rotating door structures, further refinements within the spirit and scope of the subject invention may also be carried out in the sliding door embodiment of FIG. 6.

Although the subject invention is not limited to the use of any particular type of ranger module, FIG. 5 shows a block and circuit diagram of existing integrated circuits. In particular, the ultrasonic ranger module 71 shown in FIG. 5 employs at 781 a sonar ranging control IC SN28826, and at 791 a sonar ranging receiver IC SN28825, as manufactured and sold by Texas Instruments Incorporated in their Ranging Module PCB SN28827, with modifications as herein indicated.

Most importantly, the illustrated preferred embodiment of the subject invention avoids a drawback of ultrasonic ranger units which has heretofore been viewed as a strength thereof. In particular, in order to receive echo pulses within a wide range, existing ultrasonic units employ a variable gain feature, such as the conventional gain control 162 with associated gain step counter 163 provided in the illustrated Texas Instrument IC's 781 and 791.

In this respect, the illustrated preferred embodiment connects pin 15 of IC 791 to a low level or ground, as seen at 164 in FIG. 5, while leaving pins 4 to 7 of IC 781 and pins 12 to 14 of IC 791 open. Because of internal pullup features, in the gain control 162, this in effect leaves pins 12 to 14 of IC 791 high.

While this corresponds to one of the steps suggested by Texas Instruments for detect level testing, that feature is employed according to an embodiment of the subject invention in order to change the lobe of the ultrasonic beam emitted by the associated transducer 51 so as to cover a wider area at close range. In this respect, a consideration of FIGS. 2, 3 and 6 leads to the conclusion that a person presents a rather small target to an ultrasonic transducer mounted overhead. As easily seen from FIG. 3, the person 116 would present a much larger target if hit with ultrasonic pulses from the side. However, that would leave other openings through which a clever professional could intrude, and would cause other problems with rotating or moving door leaves. Still, hitting a person from above with conventional ultrasonic equipment, emitting a relatively narrow beam at close range, would leave considerable escape holes in any feasible ultrasonic screen.

Accordingly, the illustrated preferred embodiment of the subject invention provides in effect an ultrasonic umbrella 166 or similar lobe pattern of the type shown at 166 for the transducer 58. Similar lobe patterns may also be employed for the other transducers.

One way in which the illustrated preferred embodiment of the invention provides such a favorable lobe pattern for an apprehension of intruders and other persons over a wider area, is by employing the gain control tieup feature discussed above with respect to the pins 4 to 7 of IC 781 and 12 to 15 of IC 791 and the low-level tieup at 164 in FIG. 5. This in effect increases the gain of the return signal amplification as compared to the customary gain of conventional ultrasonic units for the particular type of range. Viewed differently, the disclosed tieup of the stepped gain control in effect provides ranger modules with a magnitude of gain that conventional units only provided for a distance from the transducer farther than the floor 94.

Also, a feedback resistor 168 of the echo signal amplifier 169 may be adjusted to increase gain or return signal amplification.

Either or both of these gain increasing features may be employed in practice to increase the lateral coverage attainable with each transducer at close range. The above mentioned feature affecting the gain control 162 has the further advantage of voiding ultrasonic spikes due to gain control stepping in conventional units.

Where increased acoustic and electromagnetic noise sensitivity caused by the increased gain presents a problem, such sensitivity may be compensated according to the illustrated preferred embodiment by making an integrating capacitor 171 between pin 8 of IC 781 and pin 9 of IC 791 sufficiently large as to shunt acoustic and electromagnetic noise and to smooth out transient noise sensitivity.

The transmitter part 781 of the illustrated unit has an internal oscillator 172 controlled by a crystal 173.

The output of the oscillator 172 is divided in frequency by two factors at 174; the higher of these being for the transmit mode and the lower for echo receiving purposes. Operation of the transmit IC 781 is initiated by applying the clock output pulse 781 to what has been designated in conjunction with FIG. 4 as the EN input of the ranger module. In FIG. 4, that is pin 14 of the transmit IC 781, through which the leading edge of each clock pulse is applied to the frequency divider 174 and to an R-S latch 176, whereby no transmit pulse can infiltrate the echo circuitry directly.

A booster or inverter 177 may be employed as necessary to adapt the output of clock 77 to its desired task in the transmitter IC 781.

The frequency divider 174 is connected to the gain step counter 163 which emits a transmit gate signal to a NAND element 179 which, in turn, applies the higher frequency output of the divider 174 to the base of a transistor 181. That transistor has a grounded emitter and a collector connected to a primary winding 182 of a transformer 183. A lead 184 supplies collector current to the transistor 181 through the transformer primary 182. A diode 185 in the transmitter IC 781 is connected to the lead 184 and may supply operating current to the internal circuits. An external capacitor 186 establishes an alternating-current path to ground.

The transformer 183 has a secondary winding 188 which supplies the ultrasonic frequency bursts induced therein to the ultrasonic transducer 51 via a coupling capacitor 189 and the terminal labeled IN. A Zener diode 191 or similar unidirectional current conducting device across the terminals of the transducer 51 enables the emission of ultrasonic pulses 65.

When ultrasonic echoes 66 return, the transducer 51 applies them through the input IN to an input resistor 193. A number of diodes 195 connected thereto form a phantom ground preventing echo signals to be shunted to ground.

Accordingly, electrical signals corresponding to returning echoes are applied from the input resistor 193 to the comparator or amplifier stages 169, 196, 197, 198 and 199 in the receiver integrated circuit 791.

External components of that IC include a tuned parallel circuit 200 between the positive supply line 184 and the junction between amplifier stages 196 and 197. Suggested values for the components of that tuned circuit include one millihenry for the inductance and 0.01 microfarad for the capacitance of the tuned circuit 200.

An external capacitor 201 provides an alternating current path between the stages 197 and 198.

A reference regulator 202 at the gain control 162 is biased via a resistor 203 to ground.

The echo signal output of the receiver IC 791 is applied via pin 9 to pin 8 of the transmitter IC 781 and hence via a comparator or operational amplifier 205 to be set input of the latch 176 which thus applies signals representative of returned echoes to the EO output of the ranger module 71. It may be noted in this respect that the IC 781 is of a type wherein undesired echo signals are surpressed by resetting of the latch 176 with signals proceeding through the OR element 92 from the face, floor and muntin blanking circuits shown in FIG. 4. Accordingly, with the ranger module version shown in FIG. 5, echoes are actually received from the floor and from the ledges 102 and muntin 104, but are gated out at 176 in response to blanking pulses received through the BL input. However, ultrasonic pulses which would be directed from passing door leaves are still prevented from occurring in both embodiments of FIGS. 4 and 5, by disabling or interrupting the clock 77 in response to such passing door leaves.

In general, echoes emanating from the floor and from the door are timed out or eliminated, and a remainder of the echoes of the sent out ultrasonic pulses are used for generating electric signals indicative of a person at the door. Such signals are subjected to amplification, such as with the amplifier means 169, 196, 197, etc. shown in FIG. 5.

As indicated at 166 in FIG. 3, an area between the location 96 and the floor 94 in which a person may be sensed is broadened by increasing the echo electric signal amplification in gain, and the person 116 may then be indicated with such amplified electric signals over the broadened area shown, for instance, at 166 in FIG. 3.

As shown at 168 in FIG. 5, the amplifier means may be provided with a feedback, and a lobe pattern in which echoes are received, such as indicated at 166 in FIG. 3, is broadened by decreasing that feedback as disclosed above.

As also disclosed above, such lobe pattern 166 may be broadened by increasing the gain of the amplifier means, such as in the manner disclosed above with reference to the grounding 164 of pin 15 and the disconnection of the pin 12 to 14 of the receiver IC 791 in FIG. 5.

The remaining transducers 51, 52, 53, etc. may also be provided with broadened lobe patterns by decreasing the feedback or increasing the gain of their associated ranger modules. According to the illustrated preferred embodiment, this is done by providing a predetermined echo signal amplification gain initially for a distance from transducer 51, etc, to a location farther than the floor 94, but by then applying that gain to a distance closer to the transducer than the floor.

In practice, such approaches are vastly superior to attempts to close as many loopholes in the ultrasonic pulse screen as possible, by criss-crossing the ultrasonic pulse beams. Also, the floor blanking disclosed with the aid of FIG. 5 is superior in practice to a kind of floor blanking which simply cuts off an ultrasonic electric signal outside of the ranger modules, and which projects the ultrasonic pulse beam at such an angle that echoes cannot return over the same angled path.

Figure 7:
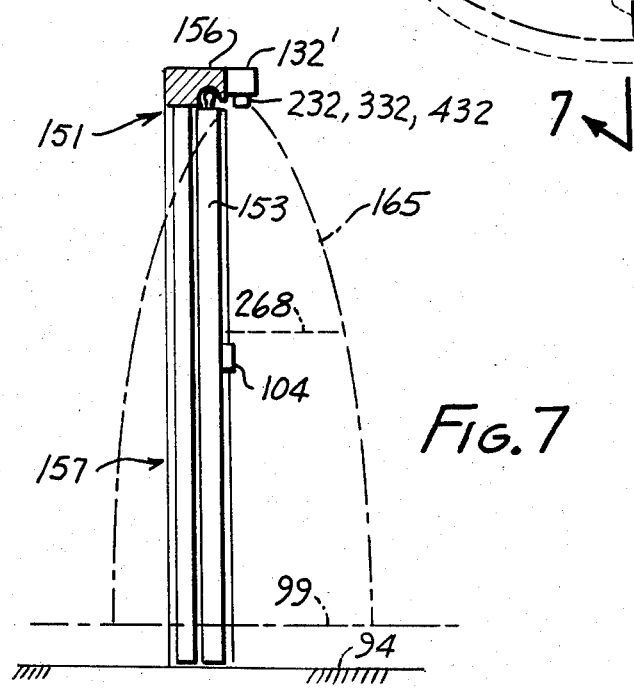
FIG. 7 is a section alon the line 7—7 in FIG. 6, with certain modifications.

According to an embodiment of the subject invention, the safety feature disclosed at 132 and 165 in FIG. 6 and described above, may be expanded such as for example, in the manner specifically illustrated in FIGS. 7 and 8. Also, either the safety feature of FIG. 6 or the expanded safety feature of FIGS. 7 and 8 need not necessarily be employed in conjunction with the ultrasonic person approach sensing feature disclosed in FIG. 6 at 51, 52, 53, etc., but may in practice be employed in conjunction with an optical, microwave or other non-ultrasonic person approach sensing feature.

Such other person approach sensing feature is conventional and is thus not shown in FIG. 7.

As indicated in FIG. 7, the lobe pattern of transmitted ultrasonic pulses 165 in which echoes are received may then be broadened such as by increasing amplifier gain or decreasing amplifier feedback in the particular ranger module, such as the ranger module 71 disclosed, for instance, in FIGS. 5 and 8.

Also, the ultrasonic beam pattern may be broadened using two or more ultrasonic transducers, such as the transducers 232, 332 and 432 shown for the transducer unit 132' in FIGS. 7 and 8. As indicated in the latter figure, outer ultrasonic transducers 232 and 432 may be slanted outwardly to cover the entire door opening 157. An ultrasonic beam reflection technique may thereby be employed on opposed door jambs, such as in the manner indicated at 144 and 145 in FIG. 3.

The ultrasonic unit driver and door control circuitry 210 shown in FIG. 8 represents an embodiment according to which the timing out of certain echoes is effected by suspending transmission of certain ultrasonic pulses into the space served by the ultrasonic transducers.

By way of example, multivibrator or timer elements may be employed for this purpose. For instance, a Quad timer, such as the Signetics Type 558, may be employed for providing the clock 77, floor blanking 100, muntin blanking 108 and timer 212 elements shown in FIG. 8.

The clock element 77 has a trigger input 213, a timing input 214 and a clock output 215. Resistive and capacitive elements are connected to the element 77 in a conventional manner to provide the desired clock output at 215 for controlled application to the initiate or enable input EN of the ranger module 71.

The clock output 215 is applied to a trigger input 216 of the floor blanking element 100. RC elements 218 and 219 connected to the timing input 220 of the floor blanking element 100 set the time of that element so as to avoid transmission of those ultrasonic pulses that could produce echoes on the floor 94 below the door.

In a practical installation, the floor blanking element 100 may, for instance, be set at 10 milliseconds.

RC elements 222 and 223 connected to the timing input 224 of the muntin blanking element 108 set that element at a shorter time than the floor blanking element 100, since the muntin 104 is closer to the ultrasonic transducers than the floor 94 in the illustrated embodiment of the subject invention. By way of example, the muntin blanking element 108 may be set at 5 milliseconds.

A pullup resistor 226, the output 227 of the floor blanking element 100 and the output 228 of the muntin blanking element 108 are connected to the initiate or enable input EN of the ranger module 71.

A positive potential is applied via a resistor 230 to the trigger input 231 of the muntin blanking element 108 and to a set input 233 of a counter 234.

The counter 234 may, for instance, be an Octal Counter, such as of the Motorola Type MC 4022.

The counter 234 acts in effect as a toggler alternatively energizing NPN transistors 236 and 237. To this end, counter output pins 1 and 3 are connected to the bases of the transistors 236 and 237, respectively. Counter output pin 7 is connected to the reset terminal R of the counter 234, so as to cycle the counter output 1 and 3 in an alternating manner.

The counter 234 is part of a multiplexing system similar in effect to the multiplexer 79 shown in FIG. 4 and described above. However, while the multiplexer 79 sequentially distributes the clock output among several ranger modules, the multiplexer 238 shown in FIG. 8 sequentially connects transducers 232, 332 and 432 to the IN terminal of the ranger module 71 shown in FIG. 8.

In particular, the periodically energized transistor 236 correspondingly switches a double-throw contact arrangement 241 via a relay 242, and the alternatingly energized transistor 237 switches a double-throw contact arrangement 244 via a relay 245. When both relays 242 and 245 are deenergized, the double-throw contact arrangements 241 and 242 are in their illustrated positions, whereby the transducer 432 is connected to the ranger module 71. When the relay 242 is energized, the central transducer 332 is connected to the ranger module 71. When alternatively relay 245 is energized, the transducer 232 is connected to the ranger module 71. By further alternative energization of the relays 242 and 245, the transducers 232, 332 and 432 are cycled among the ranger module 71. In this manner, the transducers are prevented from undesirably influencing each other and from thereby affecting the operation of the ranger module.

A microswitch 247 closes when the door 151 is open; that is, when the door panels 152 and 153 are located away from each other for a provision of the complete door opening 157. In that case, a light-emitting diode 248 of an optocoupler 249 causes a phototransistor 251 to connect the timing input 224 of the muntin blanking element 108 to ground. Accordingly, the output 226 of the floor blanking element 100 then overrides the muntin blanking element 108, inasmuch as no muntin is then present in the door opening 157. The muntin blanking element 108 then presents an open collector output at 228 to the pullup resistor 226.

The ranger module 71 is thus enabled and applies ultrasonic frequency signals via alternatively switched contact arrangements 241 and 242 in sequence to the transducers 232, 332 and 432, which thus sequentially emit ultrasonic pulses 165 into the door opening 157, such as indicated in FIG. 7.

Echoes from the floor 94 are avoided by timing out ultrasonic pulses with the floor blanking element 100 acting on the initiate or enable input EN of the ranger module 71, in keeping enabling clock pulses temporarily therefrom.

In this manner, the transducers 232, 332 and 432 cannot "see" the floor 94 and any door ledge located below the timing level 99.

On the other hand, if a person 158 steps into the door opening 157, he or she will produce ultrasonic echoes which are picked up by one or more of the transducers 232, 332 and 432. The resulting echo signals proceed via alternatingly switched contact arrangements 241 and 244 to the IN input of the ranger module 71, which, in the manner disclosed above with respect to FIG. 5 for instance, produces at the EO output of the ranger module 71 electric signals corresponding to or indicative of echoes received by the transducers 232, 332 and 432. Echo signals attributable to the floor 94 are thereby not only timed out or inhibited in a time manner by the above mentioned operation of floor blanking element 100, but are also timed out or inhibited by the muntin blanking element 108 after the switch 247 has opened. That switch opens as the door panels 152 and 153 close toward each other and the muntin 104 thereby moves within range of the transducers.

At that point, the light-emitting diode 248 is deenergized, whereby the transistor 251 no longer grounds the timing input 224. Accordingly, the muntin blanking element 108 is now capable of overriding through its output 228 the operation of the ranger module 71, whereby echoes from the muntin 104 are inhibited by timing out transmission of ultrasonic pulses which could generate undesirable echoes at the muntin 104.

Echo signals indicative of the presence of a person in the door opening 157 proceed via line 253 to the trigger input 254 of the timer element 212. RC elements 255 and 256 are connected to the timing input 257 to provide a certain delay in the generation of a timer output signal at 258. In practice, the delay provided by the timer 212 after receipt of an echo signal may be about one to two seconds, so as to prevent the monitor 210 from responding to each person which proceeds through the door opening 157 at a regular pace.

However, when the timer 212, which is reset at R, receives echo signals for more than a short duration, the presence of a person which could be hurt by the closing door, is presumed. Accordingly, the timer 212 applies an output signal to the base of an NPN transistor 261 which, in turn, energizes a couple of light-emitting diodes 262 and 263. The LED 262 serves as an indicator of a person standing in the door opening 157, while the LED 263 energizes a Triac or other semiconductive element 264 so as to provide an open command signal via terminals 265 and 266 of an optocoupler 267.

In response to that open comand signal, the door motor control associated with or embodied in the sliding door drive 154 causes such drive to arrest or stop the door closing operation immediately, so that no person standing in the door can be injured by closing door panels. Preferably, as its name implies, the open command signal appearing at terminals 265 and 266 causes the door control and the drive 154 to reopen the door completely, such as by moving the door panels 152 and 153 away from each other until the door opening 157 is fully restored. Sliding door motor controls which perform such functions are well known in the art of automatic sliding doors with edge strip sensors and other safety systems which automatically reopen a door upon the sensing of a person located therein or upon sensing the approach of a person thereto.

Opening of the door recloses the switch 247, whereby the door blanking function again overrides the muntin blanking operation. On the other hand, when the door is again closed, the switch 242 opens and the muntin blanking function takes over via element 108, as described above. In fact, as indicated by the horizontal dotted line 268 in FIG. 7, the muntin blanking function may stay on after the door has fully closed. In that case, one or more of the transducers in the unit 132' may perform the function of sensing the approach of persons to the door structure 151 and, through ultrasonic echoes from such approaching person, may cause an opening of the door, such as by application of the above mentioned open command signal to the motor control and door drive combination 154.

If desired, the approaching person sensing feature symbolized by line 268 may be supplemented, as desired, by the sensing feature illustrated in FIG. 6 at 51, 52, 53, or by an optical, capacitive, galvanic, microwave or other non-ultrasonic sensing system.

Of course, using non-ultrasonic systems would be an economic compromise at this time, auxiliary to the use of an ultrasonic system at least for the trapped or standing person feature. Also, the transmission and response lobe pattern of the transducers herein employed are readily adpatable to various situations.

For instance, care would be taken in the installation of FIGS. 6 and 7 that no moving door jamb interferes with the ultrasonic sensing function. Certain installations, including the one illustrated in FIG. 7, have an automatic echo inhibition or exclusion feature, in that ultrasonic pulses which hit the glass panel of the sliding doors 152 and 153 at a steep angle will not return echoes to the transducers, when the angle of incidence is relatively steep; that is, much steeper than the angle of incidence on the head or shoulders of a person 158.

Also, in further extension of the above mentioned echo signal amplifier or feedback feature, the lobe patterns at 65 or 165 can readily be adapted to the surrounding structure by such measures as an adjustment of the feedback at 168 or of the gain at 169 or 196 in the circuitry of FIG. 5.

The concepts of the subject invention are very versatile in practice. For instance, the circuit elements and time-out techniques shown in FIG. 8 may also be employed in the system of FIG. 4 and vice versa. In this respect, all embodiments herein disclosed fall under the broad concept of the subject invention of sensing the presence of a person in a space having thereat an object capable of reflecting ultrasonic pulses, by sending ultrasonic pulses 65 or 165 into that space and toward the objects 94, 104, etc., receiving echoes 66, etc. of ultrasonic pulses from that space, but timing out echoes from the mentioned object 94 or 104, and sensing the person 116, 131 or 158 with the aid of received echoes excluding the timed-out echoes.

Sensing apparatus according to the subject invention may include first means 51, 52, 53, 71, 72, 73, etc., for sending ultrasonic pulses 65 or 165 into the mentioned space and toward the object 94 and/or 104, second means 98, 100, 107, 108 connected to the first means, such as to the ranger modules 71, 72, 73, etc., for timing out echoes from the object 94 and/or 104, and third means, such as the element 110 and the echo signal amplification system 169, etc., connected to or included in the first means for sensing the person 116, 131 or 158 with the aid of received echoes excluding the timed-out echoes.

According to a preferred embodiment of the subject invention, the timing out of echoes is effected by timing out echoes received from the object 96 and/or 104.

In this respect, the embodiment of the subject invention disclosed with the aid of FIG. 4 and the latch 176 of FIG. 5 employ a blanking principle which, with the aid of the floor blanking elements 98 and 100 and the muntin blanking elements 107 and 108, determines travel time of ultrasonic pulses to and from the objects 94 and 104, respectively, and times out echoes received from the space in or at which such objects are located, upon occurrence of the particular travel time or times.

Where the object is a floor, such as the floor 94, or where there is otherwise no space beyond such object where a person could be located, the particular timing out may in fact be a timing out of echoes received from the particular space upon and after occurrence of the particular travel time, such as the travel time with respect to the level 99 located somewhat above the floor 94.

On the other hand, if the object is a muntin 104 or other projection beyond which there is space that may be occupied by a person to be sensed, the preferred timing out includes determining a first travel time of ultrasonic pulses in the space to and from that object and determining a second travel time of ultrasonic pulses in the space past a width of the object, such as the width 105 shown for the object 104 in FIG. 3, and timing out echoes received from the space upon occurrence of the first travel time and timing out also echoes received from the space for a duration of the second travel time. As disclosed above in connection with FIG. 4, the muntin blanking start element 107 and muntin blanking width element 108 may be employed for such echo timing-out after the above mentioned first and during the above mentioned second travel times, respectively.

Another approach, shown at 84 to 86 in FIG. 4 and 100 and 108 in FIG. 8, effects timing out by a technique including suspending transmission of those ultrasonic pulses into the space which would produce echoes at the object 94, 104 or any of the leaves 12 to 14 of the revolving door, for example. For instance, as explained above with the aid of FIGS. 2 to 4, a latch 84 with proximity switches 85 and 86 may be employed for suspending transmission of ultrasonic pulses while a door leaf passes the ultrasonic transducers.

On the other hand, and also within the scope of the subject invention, the desired timing out may include determining travel time of ultrasonic pulses in the space to the objects 94, 104, etc., and suspending transmission of ultrasonic pulses into the space prior to occurrence of that travel time. For instance, as shown in FIG. 8, timing elements 100 and 108 may be employed for suspending an application of initiating or enabling clock pulses to any ranger module for a time during which ultrasonic pulses would reach and produce echoes at an object in space, such as the muntin 104 or another projection. Again, in the case of a floor 94 or similar object, the suspension of ultrasonic transmission may take place both upon and after occurrence of the particular travel time, such as the travel time relative to the level 99 above the floor.

While the muntin blanking element has been shown in FIG. 8 as one element 108, the muntin blanking elements 107 and 108 shown in FIG. 4 may actually be employed for suspending transmission of ultrasonic pulses into the space upon occurrence of a first pulse travel time relative to the object such as the muntin 104, and for a duration of the second travel time, such as the time of travel of ultrasonic pulses past the width 105 of the particular object.

It may be noted in this respect that the expression "time-out" or "timing out" covers the dictionary sense of a brief suspension of activity or work, such as an intermission or break. In the case of the embodiment of FIG. 8 and the door leaf actuated feature of elements 84 to 86 of FIG. 4, the time out according to an embodiment of the subject invention is actually a timed suspension of ultrasonic pulse emission. If all time-outs in a given system are of the pulse emission suspension type, the ranger module blanking feature disclosed with the aid of FIGS. 4 and 5 may not be necessary. In that case, the latch 176 shown in FIG. 5, for example, need not exclude any received and amplified echoes.

On the other hand, some blanking or gating functions in the echo signal circuit will generally be required when ultrasonic pulses are actually being sent to, and echoes thereof are being received from, objects 94, 104, etc., but are suppressed, eliminated or gated out in a timed manner, such as shown at 92 and 112 in FIG. 4 and 176 in FIG. 5.

In brief, the timing out of echoes or echo signals according to the subject invention may include either a timing out of echoes or echo signals actually generated, or an inhibition or prevention of echoes in the first place, or any desired combination thereof.

Also, the expression "person" as herein employed is not necessarily restricted to human beings, but may include animals and even carts and other objects going through openings and secured spaces.

The expression "object" as applied to door leaves 12 to 14, floor 94 and muntin 104, for instance, thus applies to objects that are part of the door structure or are permanently located in or at the secured space, while the expression "person" generally refers to people, animals and pushed, drawn or propelled objects conveyed through the door structure or secured space, but not belonging thereto as a structural or permanent part.

According to the illustrated embodiments of the invention, the disclosed timing out includes timing out echoes of ultrasonic pulses from a floor 94 below the space into which the ultrasonic pulses 65, etc., are sent. Such timing out may, for instance in FIGS. 4 and 5, include elimination of signals of echoes emanating from a floor 94 below that space, or, as in FIG. 8, include suspension of an emission of ultrasonic pulses 65, etc., for a time during which such pulses could form echoes on a floor 94 below that space.

As shown by way of example in FIGS. 1 to 3, 6 and 7, the space into which ultrasonic pulses 65, etc., are sent may be provided as a door opening of a door having an object such as the floor 94 or muntin 104, located thereat. The door is actuated to an open position, such as with the aid of door control 114 and drives 33 or 154, in response to a sensing of a person at the door. Ultrasonic pulses are sent out from a location 96 or 156 above the door opening. At that location, echoes of ultrasonic pulses sent into the door opening are received, but echoes from the mentioned object are timed out as disclosed above. The presence of any person in the door opening is then sensed with said echoes of ultrasonic pulses sent into the door opening, excluding the timed-out echoes.

Where a door 10, 151, etc., is provided at the space into which ultrasonic pulses 65, etc., are sent, echoes from that door are timed out. Where the door is subjected to movement past a location from which ultrasonic pulses are sent into the particular space, the sending out of ultrasonic pulses preferably is interrupted during such movement of the door past that location.

Where the presence of a projection 104 has been determined on the door, echoes from said projection are timed out. Where a width 105 of the projection 104 in a direction in which ultrasonic pulses 65 are sent has been determined, echoes of ultrasonic pulses are timed out for a period corresponding in timing to the location, and in duration to the width, of that projection.

The presence of a person in the door is detected with echoes of ultrasonic pulses excluding the timed-out echoes.

Further ultrasonic pulses 165, etc., may be sent out, and the presence of a person in the door may be detected with the aid of echoes from these further ultrasonic pulses.

Various other modifications and variations within the spirit and scope of the subject invention and equivalents thereof will suggest themselves or become apparent to those skilled in the art from the subject extensive disclosure.

I claim:

1. A method of sensing the presence of a person in a space having thereat an object capable of reflecting ultrasonic pulses, comprising in combination the steps of:

sending ultrasonic pulses into said space and toward said object;

suspending transmission of those ultrasonic pulses into said space which would produce echoes at said object;

receiving echoes of ultrasonic pulses from said space; and sensing said person with the aid of said received echoes.

2. A method as claimed in claim 1, including the step of:

timing out any echoes received from said object.

3. A method as claimed in claim 1, including the steps of:

determinging travel time of ultrasonic pulses to and from said object, and timing out any echoes received from said space upon occurrence of said travel time.

4. A method as claimed in claim 1, including the steps of:

determining travel time of ultrasonic pulses in said space to and from said object, and timing out any echoes received from said space upon and after occurrence of said travel time.

5. A method as claimed in claim 1, including the steps of:

determining travel time of ultrasonic pulses in said space to and from said object, and timing out echoes upon occurrence of said travel time shortened by a predetermined tolerance.

6. A method as claimed in claim 1, including the steps of:

determining travel time of ultrasonic pulses in said space to and from said object, and timing out echoes upon and after occurrence of said travel time shortened by a predetermined tolerance.

7. A method as claimed in claim 1, including the steps of:

determining a first travel time of ultrasonic pulses in said space to and from said object and a second travel time of ultrasonic pulses in said space past a width of said object, and timing out echoes upon occurrence of said first travel time shortened by a predetermined tolerance and for a duration of said second travel time.

8. A method as claimed in claim 1, wherein said sensing includes:

generating electric signals indicative of received echoes of said ultrasonic pulses;

subjecting said electric signals to amplifi- cation;

broadening an area in said space in which a person may be sensed, by increasing said amplification in gain; and indicating with said electric signals said person over said broadened area, but excluding signals corresponding to said timed-out echoes.

9. A method as claimed in claim 8, including the steps of:

providing amplifier means for effecting said signal amplification;

providing said amplifier means with a feedback; and broadening a lobe pattern in which said echoes are received by decreasing said feedback.

10. A method as claimed in claim 8. including the steps of:

providing amplifier means with a gain for effecting said signal amplification; and broadening a lobe pattern in which said echoes are received by increasing said gain of said amplifier means.

11. A method as claimed in claim 1, including the step of:

timing out echoes of ultrasonic pulses from a floor below said space.

12. A method as claimed in claim 1, including the step of:

eliminating signals of echoes emanating from a floor below said space.

13. A method as claimed in claim 1, wherein:

said object includes a door leaf; and said suspension includes suspending an emission of ultrasonic pulses for a time during which such pulses could form echoes from said door leaf.

14. A method as claimed in claim 1, including the steps of:

providing said space as a door opening of a door having said object located thereat;

actuating said door to an open position in response to a sensing of a person at the door;

sending out ultrasonic pulses from a location above the door into said door opening;

receiving at said location echoes of ultrasonice pulses sent into the door opening; and sensing the presence of any person in the door opening with said echoes of ultrasonic pulses sent into the door opening.

15. A method as claimed in claim 1. including the step of:

providing a door at said space; and timing out echoes from said door.

16. A method of sensing the presence of a person in a space, comprising in combination the steps of:

providing a door at said space;

sending ultrasonic pulses into said space; subjecting said door to movement past a location from which ultrasonic pulses are sent into said space;

receiving echoes of ultrasonic pulses from said space, but interrupting said sending out of ultrasonic pulses during said movement of the door past said location; and sensing said person with the aid of said received echoes.

17. A method as claimed in claim 1, including the steps of:

providing a door at said space;

determining the presence of a projection on said door; and timing out echoes from said projection.

18. A method as claimed in claim 1, including the steps of:

providing a door at said space;

determining the presence and location of a projection on said door;

determining a width of said projection in a direction in which said ultrasonic pulses are sent; and timing out echoes of said ultrasonic pulses for a period corresponding in timing to said location, and in duration to said width, of said projection.

19. A method as claimed in claim 1, including the steps of:
providing a door at said space; and
detecting the presence of a person in said door with echoes from said ultrasonic pulses.

20. A method as claimed in claim 1, including the steps of:
providing a door at said space; and
sending out further ultrasonic pulses; and
detecting the presence of a person in said door with the aid of echoes from said further ultrasonic pulses.

21. A method of sensing the presence of a person in a space having thereat an object capable of reflecting ultrasonic pulses, comprising in combination the steps of:
sending ultrasonic pulses into said space and toward said object;
receiving echoes of ultrasonic pulses from said space, but timing out echoes from said object; and
sensing said person with the aid of said received echoes excluding said timed-out echoes; wherein
said timing out includes determining a first travel time of ultrasonic pulses in said space to and from said object and a second travel time of ultrasonic pulses in said space past a width of said object, and timing out echoes received from said space upon occurrence of said first travel time and echoes received from said space for a duration of said second travel time.

22. A method of sensing the presence of a person in a space, including the steps of:
providing a revolving door structure having rotatable door leaves in said space;
sending ultrasonic pulses into said space;
timing out echoes form any door leaf of said revolving door structure;
receiving echoes of said ultrasonic pulses from between said door leaves; and
sensing a person in said revolving door structure with the aid of said echoes.

23. A method as claimed in claim 22, including the step of:
interrupting said sending out of ultrasonic pulses whenever a leaf of said rotating door structure is moving past said location.

24. A method as claimed in claim 22, including the steps of:
rotating said door leaves above a floor;
sending out ultrasonic pulses from a location above said rotating door leaves into spaces between said leaves;
receiving echoes of ultrasonic pulses sent into said spaces, but timing out echoes from said floor; and
sensing the presence of a person in said revolving door structure from said received echoes of ultrasonic pulses sent into said spaces excluding said timed-out echoes from said floor.

25. A method as claimed in claim 22, including the steps of:
determining the presence of a projection on any of said door leaves; and
timing out echoes from said projection.

26. A method as claimed in claim 22, including the steps of:
detecting the presence of a person trapped in said revolving door structure between door leaves; and
indicating said detected presence of a trapped person.

27. A method as claimed in claim 22, including the steps of:
sending out further ultrasonic pulses when said revolving door structure is stopped; and
detecting with the aid of echoes from said further ultrasonic pulses the presence of a person trapped in said revolving door structure between door leaves when said revolving door structure is stopped.

28. A method as claimed in claim 27, including the step of:
providing a trapped person alarm in response to said echoes from the further ultrasonic pulses.

29. A method as claimed in claim 22, wherein:
said ultrasonic pulses are sent out from said predetermined location at an entrance of said revolving door structure;
further ultrasonic pulses are sent out from a location at an exit of said revolving door structure;
echoes of said further ultrasonic pulses are received free of echoes from said door structure; and
authorized passage of a person through said revolving door structure is verified with the aid of echoes of ultrasonic pulses sent out from said predetermined location at said entrance, and echoes of said further ultrasonic pulses.

30. A method of sensing the presence of a person in a space, comprising in combination the steps of:
sending ultrasonic pulses into said space;
receiving echoes of said ultrasonic pulses from said space;
using said echoes for generating electric signals indicative of a person in said space;
subjecting said signals to amplification;
broadening an area in said space in which a person may be sensed, by increasing said amplification in gain; and
indicating with said electric signals said person over said broadened area.

31. A method as claimed in claim 30, including the steps of:
providing amplifier means for effecting said signal amplification;
providing said amplifier means with a feedback; and
broadening a lobe pattern in which said echoes are received by decreasing said feedback.

32. A method as claimed in claim 30, including the steps of:
providing amplifier means with a gain for effecting said signal amplification; and
broadening a lobe pattern in which said echoes are received by increasing said gain of said amplifier means.

33. Apparatus for sensing the presence of a person in a space having thereat an object capable of reflecting ultrasonic pulses, comprising in combination:
first means for sending ultrasonic pulses into said space and toward said object and for receiving echoes of ultrasonic pulses from said space;
second means connected to said first means for suspending transmission of those ultrasonic pulses into said space which would produce echoes at said object; and
third means connected to said first means for sensing said person with the aid of said received echoes.

34. Apparatus as claimed in claim 33, wherein:
said second means include means for timing out echoes received from said object.

35. Apparatus as claimed in claim 33, wherein:
said second means include means for timing out echoes received from said space upon occurrence of a predetermined travel time of ultrasonic pulses to and from said object.

36. Apparatus as claimed in claim 33, wherein:
said second means include means for timing out echoes received from said space upon and after occurrence of a predetermined travel time of ultrasonic pulses in said space to and from said object.

37. Apparatus as claimed in claim 33, wherein:
said second means include means for suspending transmission of ultrasonic pulses into said space for a time during which ultrasonic pulses in said space would reach and produce echoes at said object.

38. Apparatus as claimed in claim 33, wherein:
second means include means for suspending transmission of ultrasonic pulses into said space for a time during which ultrasonic pulses in said space would reach and produce echoes at said object.

39. Apparatus as claimed in claim 33, wherein:
said second means include means for suspending transmission of ultrasonic pulses into said space for a first travel time during which ultrasonic pulses in said space would reach and produce echoes at said object and for a duration of a second travel time of ultrasonic pulses in said space past a width of said object.

40. Apparatus as claimed in claim 33, wherein said second means include:
means for generating electric signals indicative of received echoes of said ultrasonic pulses;
means connected to said generating means for subjecting said electric signals to amplification;
means for broadening an area in said space in which a person may be sensed, including means for increasing said amplification in gain; and
means connected to said amplification subjecting means for indicating with said electric signals said person over said broadened area, exclusive of signals corresponding to said timed-out echoes.

41. Apparatus as claimed in claim 33, wherein:
said second means include means for timing out echoes of ultrasonic pulses from a floor below said space.

42. Apparatus as claimed in claim 33, wherein:
said second means includes means for eliminating signals of echoes emanating from a floor below said space.

43. Apparatus as claimed in claim 33, wherein:
said object includes a door leaf; and
said second means include means for suspending an emission of ultrasonic pulses for a time during which such pulses could form echoes from said door leaf.

44. Apparatus as claimed in claim 33, including:
a door at said space; and
means in said second means for timing out echoes from said door.

45. Apparatus as claimed in claim 33, including:
a door at said space including a projection on said door; and
means in said second means for timing out echoes from said projection.

46. Apparatus as claimed in claim 33, including:
a door at said space including at a predetermined location a projection having a predetermined width in a direction in which said ultrasonic pulses are sent; and
means in said second means for timing out echoes of said ultrasonic pulses for a period corresponding in timing to said location, and in duration to said width, of said projection.

47. Apparatus as claimed in claim 33, including:
a door at said space; and
means in said third means for detecting the presence of a person in said door with echoes from said ultrasonic pulses.

48. Apparatus as claimed in claim 33, including:
a door at said space;
means for sending out further ultrasonic pulses; and
means for detecting the presence of a person in said door with the aid of echoes from said further ultrasonic pulses.

49. Apparatus for sensing the presence of a person in a space, including the steps of:
a revolving door structure having rotatable door leaves in said space;
first means for sending ultrasonic pulses into said space;
second means for timing out echoes from any door leaf of said revolving door structure and for receiving echoes of said ultrasonic pulses from between said door leaves; and
third means for sensing a person in said revolving door structure with the aid of said received echoes.

50. Apparatus as claimed in claim 49, including:
means in said second means for interrupting said sending out of ultrasonic pulses whenever a leaf of said rotating door structure is moving past a location from which said ultrasonic pulses are sent.

51. Apparatus as claimed in claim 49, including:
means for rotating said door leaves above a floor;
means for timing out echoes from said floor; and
means in said third means for sensing the presence of a person in said revolving door structure from said received echoes of ultrasonic pulses sent into said space exclusive of said timed-out echoes from said floor.

52. Apparatus as claimed in claim 49, including:
a projection on any of said door leaves; and
means in said second means for timing out echoes from said projection.

53. Apparatus as claimed in claim 49, including:
means for detecting the presence of a person trapped in said revolving door structure between door leaves; and
means connected to said detecting means for indicating said detected presence of a trapped person.

54. Apparatus as claimed in claim 49, including:
means for sending out further ultrasonic pulses when said revolving door structure is stopped; and
means connected to said means for sending out further ultrasonic pulses for detecting with the aid of echoes from said further ultrasonic pulses the presence of a person trapped in said revolving door structure between door leaves when said revolving door structure is stopped.

55. Apparatus as claimed in claim 54, including:
means connected to said detecting means for providing a trapped person alarm in response to said echoes from the further ultrasonic pulses.

56. Apparatus as claimed in claim 49, wherein:

said first means include means for sending out said ultrasonic pulses from a predetermined location at an entrance of said revolving door structure, and for sending out further ultrasonic pulses from a location at an exit of said revolving door structure;

said second means include means for receiving echoes of said further ultrasonic pulses but timing out echoes from said door structure; and said third means include means for verifying authorized passage of a person through said revolving door structure with the aid of echoes of ultrasonic pulses sent out from said predetermined location at said entrance, and echoes of said further ultrasonic pulses.

57. Apparatus for sensing the presence of a person in a space having thereat an object capable of reflecting ultrasonic pulses, comprising in combination:

first means for sending ultrasonic pulses into space and toward said object and for receiving echoes of ultrasonic pulses from said space;

second means connected to said first means for timing out echoes from said object; and third means connected to said first means for sensing said person with the aid of said received echoes excluding said timed-out echoes; wherein said second means include means for timing out echoes received from said space upon occurrence of a first travel time of ultrasonic pulses in said space to and from said object and echoes received from said space for a duration of a second travel time of ultrasonic pulses in said space past a width of said object.

58. Apparatus for sensing the presence of a person in a space having a door thereat, comprising in combination:

first means for sending ultrasonic pulses into said space and toward said object and for receiving echoes of ultrasonic pulses from said space;

means connected to said door for subjecting said door to movement past a location from which ultrasonic pulses are sent into said space by said first means;

second means for interrupting said sending of ultrasonic pulses into said space during said movement of the door past said location; and third means connected to said first means for sensing said person with the aid of said received echoes.

* * * * *